US012743718B1

(12) United States Patent
Gamhewa et al.

(10) Patent No.: US 12,743,718 B1
(45) Date of Patent: Sep. 22, 2026

(54) ADAPTIVE PRODUCT INFORMATION PLATFORM

(71) Applicant: Velou Inc., New York, NY (US)

(72) Inventors: Sadeesha Gamhewa, New York, NY (US); Gavin James Hewitt, Shoreline, WA (US); Anupama Jayana Kalansuriya, Kaduwela (LK); Diyunugalge Inoka Samantha Kumara Dissanayaka, Mattegoda (LK)

(73) Assignee: Velou Inc., New York, NY (US)

(*) Notice: Subject to any disclaimer, the term of this patent is extended or adjusted under 35 U.S.C. 154(b) by 0 days.

(21) Appl. No.: 19/254,859

(22) Filed: Jun. 30, 2025

(51) Int. Cl.
*G06Q 30/06* (2023.01)
*G06Q 30/0601* (2023.01)

(52) U.S. Cl.
CPC ..... *G06Q 30/0627* (2013.01); *G06Q 30/0603* (2013.01); *G06Q 30/0641* (2013.01)

(58) Field of Classification Search
CPC ........... G06Q 30/0623–0629; G06Q 30/0641–0643; G06Q 30/0613–0619; G06Q 30/0239; G06Q 30/0631; G06Q 30/0627; G06Q 30/0603
USPC ....................................................... 705/26.63
See application file for complete search history.

(56) References Cited

U.S. PATENT DOCUMENTS 9,773,269 B1 * 9/2017 Lazarus .................. G06F 21/00
10,304,111 B1 * 5/2019 Sarmento ........... G06Q 30/0613
10,769,698 B2 * 9/2020 Tishkevich ............ G06Q 30/02
2015/0046300 A1 * 2/2015 Menipaz ............ G06Q 30/0601 705/28
2016/0300275 A1 * 10/2016 Kapoor .................. G06Q 30/02
(Continued)

FOREIGN PATENT DOCUMENTS

CN 118917562 A * 11/2024 ........... G06F 16/285
CN 122001702 A * 5/2026 ............. H04L 12/28

OTHER PUBLICATIONS

Aanen, S., et. al. "Automated product taxonomy mapping in an e-commerce environment," Expert Systems with Applications, vol. 42, Issue 3, pp. 1298-1313, ISSN 0957-4174, https://doi.org/10.1016/j.eswa.2014.09.032. (Year: 2015).*
(Continued)

*Primary Examiner* — Yogesh C Garg
(74) *Attorney, Agent, or Firm* — John W. Branch; Branch Partners PLLC

(57) ABSTRACT

Embodiments generate and manage adaptive product information. Candidate values for products may be collected based on received product information. Candidate values may be validated based on attributes in a product taxonomy such that the validated candidate values are normalized to conform to the product taxonomy. Product profiles may be obtained for the products based on the attribute values such that the product profiles may be distributed to channels that may enable access to the products for consumers. Feedback information associated with the products may be continuously collected from the channels such that the product taxonomy may be iteratively updated based on the feedback information and such that the update may include new attribute values associated with the feedback information. The product profiles may be continuously updated based on the updated product taxonomy such that the updated product profiles are redistributed to the channels.

20 Claims, 16 Drawing Sheets

(56) References Cited

U.S. PATENT DOCUMENTS

2018/0121979 A1* 5/2018 Yang .................. G06Q 30/0603
2018/0174219 A1* 6/2018 Jadhav ................... G06Q 50/01
2024/0386015 A1* 11/2024 Crabtree ............. G06F 16/9024
2025/0029174 A1* 1/2025 Sahoo .................... G06Q 10/10

OTHER PUBLICATIONS

Das, P., et. al. "Large-scale taxonomy categorization for noisy product listings," 2016 IEEE International Conference on Big Data (Big Data), Washington, DC, USA, pp. 3885-3894, doi: 10.1109/BigData.2016.7841063. (Year: 2016).*
Wong, T., et. al. "Normalizing web product attributes and discovering domain ontology with minimal effort." In Proceedings of the fourth ACM international conference on Web search and data mining (WSDM '11). Association for Computing Machinery, New York, NY, USA, 805â814. (Year: 2011).*
Wolniak R, Stecula K, Aydn B. Digital Transformation of Grocery In-Store Shopping-Scanners, Artificial Intelligence, Augmented Reality and Beyond: A Review. Foods. Sep. 18, 2024;13(18):2948. Retrieved from ip.com on Jun. 21, 2026, (Year: 2024).*

* cited by examiner

Fig. 3

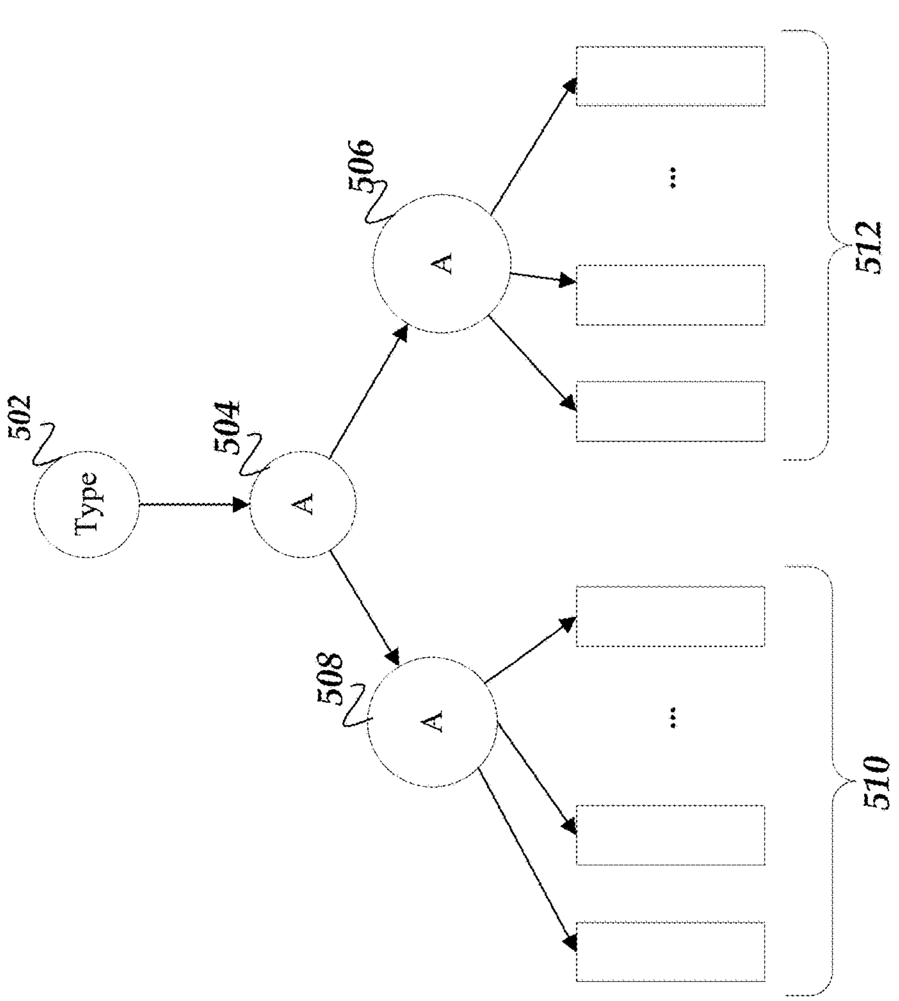
*Fig. 5*

800
804
Current Taxonomy
802
Taxonomy Model
806
Marketing Information
808
Updated Taxonomy 810
814
Product Taxonomy
812
Product Model
816
Product Information
818
Product Profile

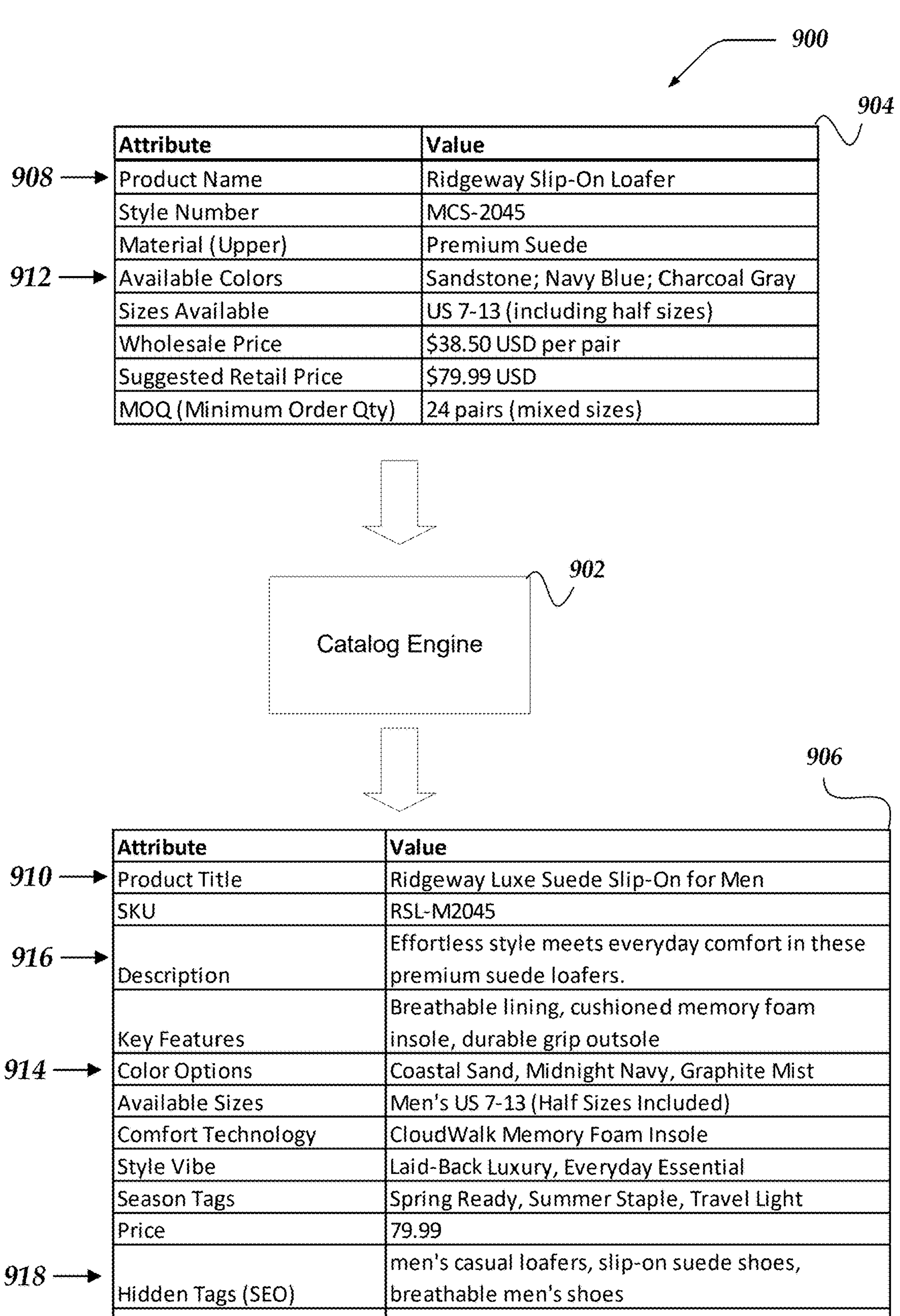

| Attribute | Value |
|---|---|
| Product Name | Ridgeway Slip-On Loafer |
| Style Number | MCS-2045 |
| Material (Upper) | Premium Suede |
| Available Colors | Sandstone; Navy Blue; Charcoal Gray |
| Sizes Available | US 7-13 (including half sizes) |
| Wholesale Price | $38.50 USD per pair |
| Suggested Retail Price | $79.99 USD |
| MOQ (Minimum Order Qty) | 24 pairs (mixed sizes) |

| Attribute | Value |
|---|---|
| Product Title | Ridgeway Luxe Suede Slip-On for Men |
| SKU | RSL-M2045 |
| Description | Effortless style meets everyday comfort in these premium suede loafers. |
| Key Features | Breathable lining, cushioned memory foam insole, durable grip outsole |
| Color Options | Coastal Sand, Midnight Navy, Graphite Mist |
| Available Sizes | Men's US 7-13 (Half Sizes Included) |
| Comfort Technology | CloudWalk Memory Foam Insole |
| Style Vibe | Laid-Back Luxury, Everyday Essential |
| Season Tags | Spring Ready, Summer Staple, Travel Light |
| Price | 79.99 |
| Hidden Tags (SEO) | men's casual loafers, slip-on suede shoes, breathable men's shoes |
| Shipping & Returns | Free Shipping & 30-Day Easy Returns |

*Fig. 9*

| Attribute | Values | Alts |
|---|---|---|
| Age Group | Adult | n/a |
| Color | Multicolor | n/a |
| Gender | Women | [...] |
| Length | Midi | [...] |
| Neckline | V-neck | n/a |
| Pattern | Floral | [...] |
| Sleeve Length | Short | [...] |
| Style | A-Line | [...] |
| ... | ... | ... |

ADAPTIVE PRODUCT INFORMATION PLATFORM

TECHNICAL FIELD

These innovations relate generally to computer associated security, and more particularly, but not exclusively, to adaptive product information management.

BACKGROUND

In today's rapidly evolving digital marketplace, organizations face significant challenges in managing product catalog information across multiple sales channels and platforms. Traditional catalog management systems rely heavily on manual processes for product categorization, attribute assignment, and content generation, leading to inconsistent product descriptions, incomplete attribute data, and delayed updates to reflect market trends.

Conventional catalog systems typically require manual entry and maintenance of product attributes, which can be both time-consuming and prone to human error. When new products are introduced or existing products are modified, catalog administrators must manually update product information across multiple systems and channels, often resulting in inconsistencies between different sales platforms. This manual approach may become particularly problematic if organizations need to manage thousands or millions of products across diverse categories and markets.

Furthermore, traditional systems struggle to adapt to dynamic market conditions and emerging terminology. As consumer preferences evolve and new product features gain popularity, catalog systems often lag behind in incorporating relevant search terms, attribute values, and descriptive content that customers actually use when searching for products. This disconnect between catalog content and customer search behavior can significantly impact product discoverability and sales conversion rates.

Thus, it is with respect to these considerations and others that these present innovations have been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 3 illustrates a schematic embodiment of a network computer;

FIG. 5 illustrates a logical schematic of a product taxonomy for adaptive product information platforms in accordance with one or more of the various embodiments;

FIG. 9 illustrates a logical schematic of a system for adaptive product information platforms in accordance with one or more of the various embodiments;

DETAILED DESCRIPTION OF VARIOUS EMBODIMENTS

Figure 1:
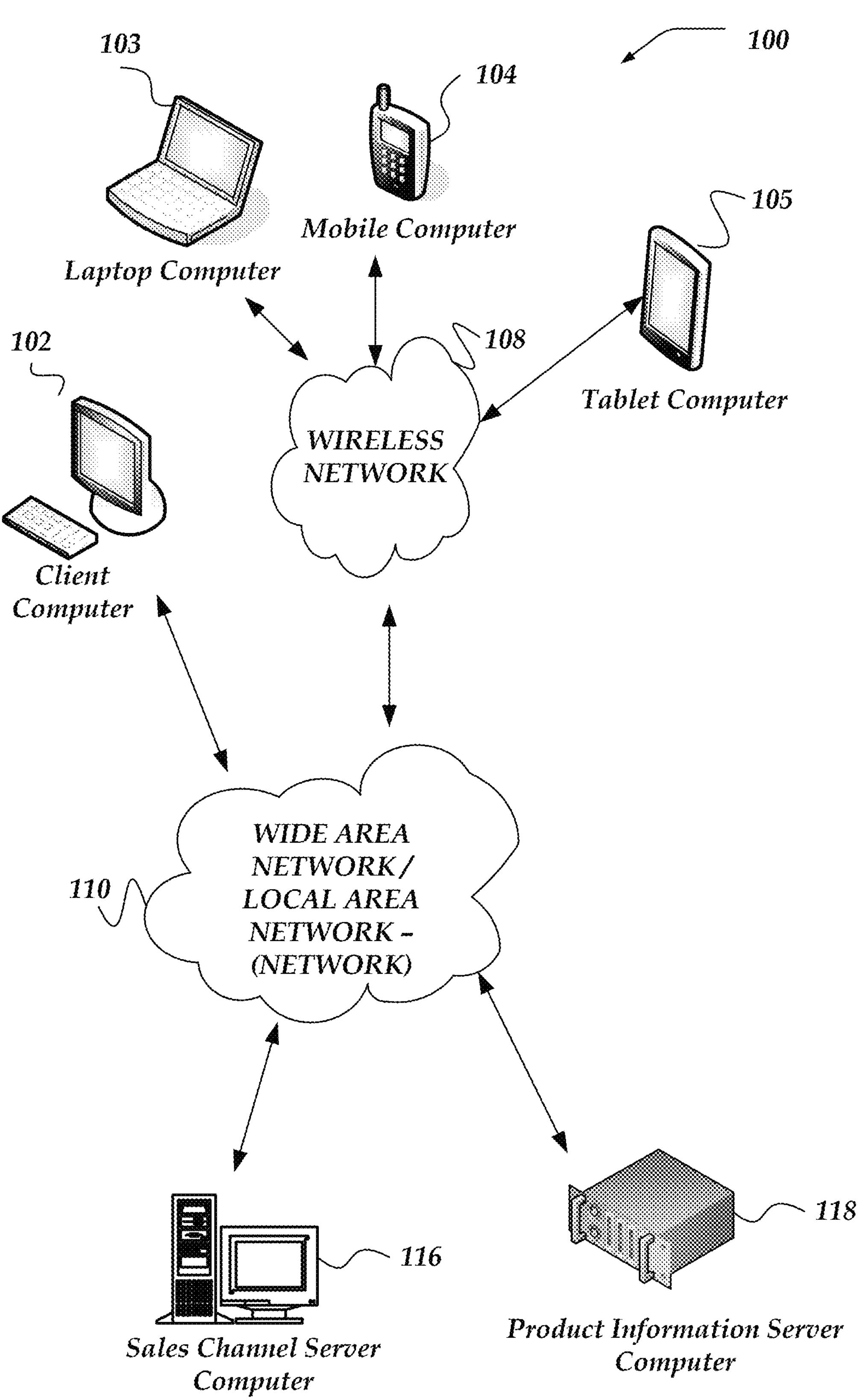
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which these innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of these innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java, PHP, Perl, Python, R, Julia, JavaScript, Ruby, VBScript, Microsoft .NET languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the terms "large language model," or "LLM" refer to data structures, programs, or the like, that may be trained or designed to perform a variety of natural language processing tasks. Typically, LLMs may generate text responses in response to text based prompts. Often, LLMs may be considered to be neural networks that have been trained on large collections of natural language source documents. Accordingly, in some cases, LLMs may be trained to generate predictive responses based on provided prompts. LLM prompts may include context information, examples, or the like, that may enable LLMs to generate responses directed to specific queries or particular problems that go beyond conventional NLP.

As used herein, the terms "prompt, or" prompt dataset" refer to one or more data structures that contain or represent prompt information that may be provided to LLMs.

As used herein, the term "channel" refers to a digital sales platform, distribution platform, or marketing platform through which product information may be displayed, promoted, or sold to customers. Channels may include, but are not limited to, e-commerce stores, online advertising platforms, AI-based search engines, recommendation sites, online marketplaces, social media platforms, or other digital platforms that present product catalog information to end users. A channel may be configured to receive product profiles or product description content from catalog engines and may provide feedback regarding user interactions, search patterns, conversion metrics, or other performance data related to the presented product information.

As used herein, the term "marketing information" refers to data, or content obtained from various internal or external sources that may be relevant to product categorization, attribute identification, or taxonomy enhancement within adaptive product information platforms. Marketing information may include, industry reports, fashion trend analyses, celebrity style publications, social media content, product announcements, catalog feeds, trend forecasting data, real-time cultural commentary, industry publications, or the like. In some embodiments, marketing information may include multimedia content such as photographs, video clips, or other visual media that can be analyzed to identify product features, attributes, or emerging terminology.

As used herein, the term "product" refers to any item, good, service, or offering that may be cataloged, described, categorized, marketed, sold, or otherwise presented to consumers or end users through one or more channels. Products may include, but are not limited to, physical goods such as clothing, electronics, home goods, automotive parts, food items, or consumer merchandise; digital goods such as software applications, digital media, online content, or virtual items; services such as professional services, consulting, maintenance, subscriptions, warranties, or support offerings; or combinations thereof. In some cases, a product may represent a single discrete item, a bundled collection of items or services, a configurable product with multiple variations or options, or a product family that encompasses related items sharing common attributes or characteristics. Products may be associated with one or more product types within product taxonomies and may be characterized by various attributes and attribute values that describe their features, specifications, categorization, or other relevant properties for catalog management, search optimization, or channel distribution purposes.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as configuration management databases, Lightweight Directory Access Protocol (LDAP) servers, name services, public key infrastructure services, or the like.

The following briefly describes embodiments of these innovations to provide a basic understanding of some aspects of these innovations. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to adaptive product information platforms. In one or more of the various embodiments, one or more candidate values for one or more products may be collected based on received product information for one or more products.

In one or more of the various embodiments, the one or more candidate values may be validated based on one or more attributes in a product taxonomy such that the one or more validated candidate values are normalized to conform to the product taxonomy.

In one or more of the various embodiments, one or more product profiles may be obtained for the one or more products based on the one or more attribute values such that the one or more product profiles may be distributed to one or more channels that may enable access to the one or more products for a consumer.

In one or more of the various embodiments, feedback information associated with the one or more products may be continuously collected from the one or more channels such that the product taxonomy may be iteratively updated based on the feedback information and such that the update may include one or more new attribute values associated with the feedback information.

In one or more of the various embodiments, the one or more product profiles may be continuously updated based on the updated product taxonomy such that the one or more updated product profiles are redistributed to the one or more channels.

In one or more of the various embodiments, a user interface may be obtained that includes one or more display panels with content that may be dynamically transformed and arranged for display to the consumer accessing the one or more products with the one or more channels based on user telemetry, user feedback and telemetry metrics such that the content includes information associated with the one or more products.

In one or more of the various embodiments, the product information may further include one or more of vendor-provided product descriptions, product specifications, marketing materials, social media content, third-party product data feeds, or the like.

In one or more of the various embodiments, validating the one or more candidate values may include executing one or more natural language processing actions to identify semantic similarity between the one or more candidate values and one or more existing attribute values in a current product taxonomy.

In one or more of the various embodiments, normalizing the one or more candidate values may include: converting one or more synonymous terms to standardized terminology defined in a current product taxonomy; correcting one or more spelling variations based on the product taxonomy; standardizing one or more units of measurement to match the attribute values defined in the current product taxonomy; or the like.

In one or more of the various embodiments, marketing information may be obtained from one or more external sources including one or more of an industry report, a trend analysis, a fashion publication, or the like. In one or more of the various embodiments, a current product taxonomy may be updated by including one or more new attribute values extracted from the marketing information that represents one or more emerging product characteristics or trending terminology.

In one or more of the various embodiments, one or more images of the one or more products may be received. In one or more of the various embodiments, the one or more images may be analyzed to identify one or more visual characteristics of the one or more products. In one or more of the various embodiments, the one or more visual characteristics may be mapped to one or more other attribute values in a current product taxonomy.

In one or more of the various embodiments, the one or more channels may include one or more of social media, an electronic commerce platform, an online marketplace, an email marketing platform, a messaging marketing platform, an advertising platform, a digital catalog, a retail partner platform, or the like.

In one or more of the various embodiments, the feedback information may include: search query patterns from one or more consumers accessing the one or more channels; conversion statistics associated with the one or more products; customer interaction data including product view durations and engagement metrics; or the like.

In one or more of the various embodiments, the one or more product profiles may be formatted according to channel-specific requirements that may include one or more of a data schema, a content length restriction, an attribute mapping, or the like for each of the one or more channels.

In one or more of the various embodiments, the one or more attributes in the product taxonomy may be organized in a hierarchical structure where broader attribute values serve as parent values for more specific dependent attribute values. In one or more of the various embodiments, one or more dependent attributes may be activated based on one or more values of hierarchically superior attributes.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)-(network) 110, wireless network 108, client computers 102-105, sales channel server computer 116, product information server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, sales channel server computer 116, product information server computer 118, or other computers.

Client computers 102-105 may further be configured to include a client application that enables an end-user to log into an end-user account that may be managed by another computer, such as sales channel server computer 116, product information server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to product information server computer 118. Also, client computers may be arranged to enable users to display reports, interactive user-interfaces, results provided by product information server computer 118, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, sales channel server computer 116, product information server computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of sales channel server computer 116, product information server computer 118 are described in more detail below in conjunction with FIG. 3. Although FIG. 1 illustrates sales channel server computer 116, or product information server computer 118 each as a single computer, the innovations or embodiments are not so limited. For example, one or more functions of sales channel server computer 116, or product information server computer 118, or the like, may be distributed across one or more distinct network computers. Moreover, in one or more embodiments, sales channel server computer 116, product information server computer 118 may be implemented using a plurality of network computers. Further, in one or more of the various embodiments, sales channel server computer 116, product information server computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
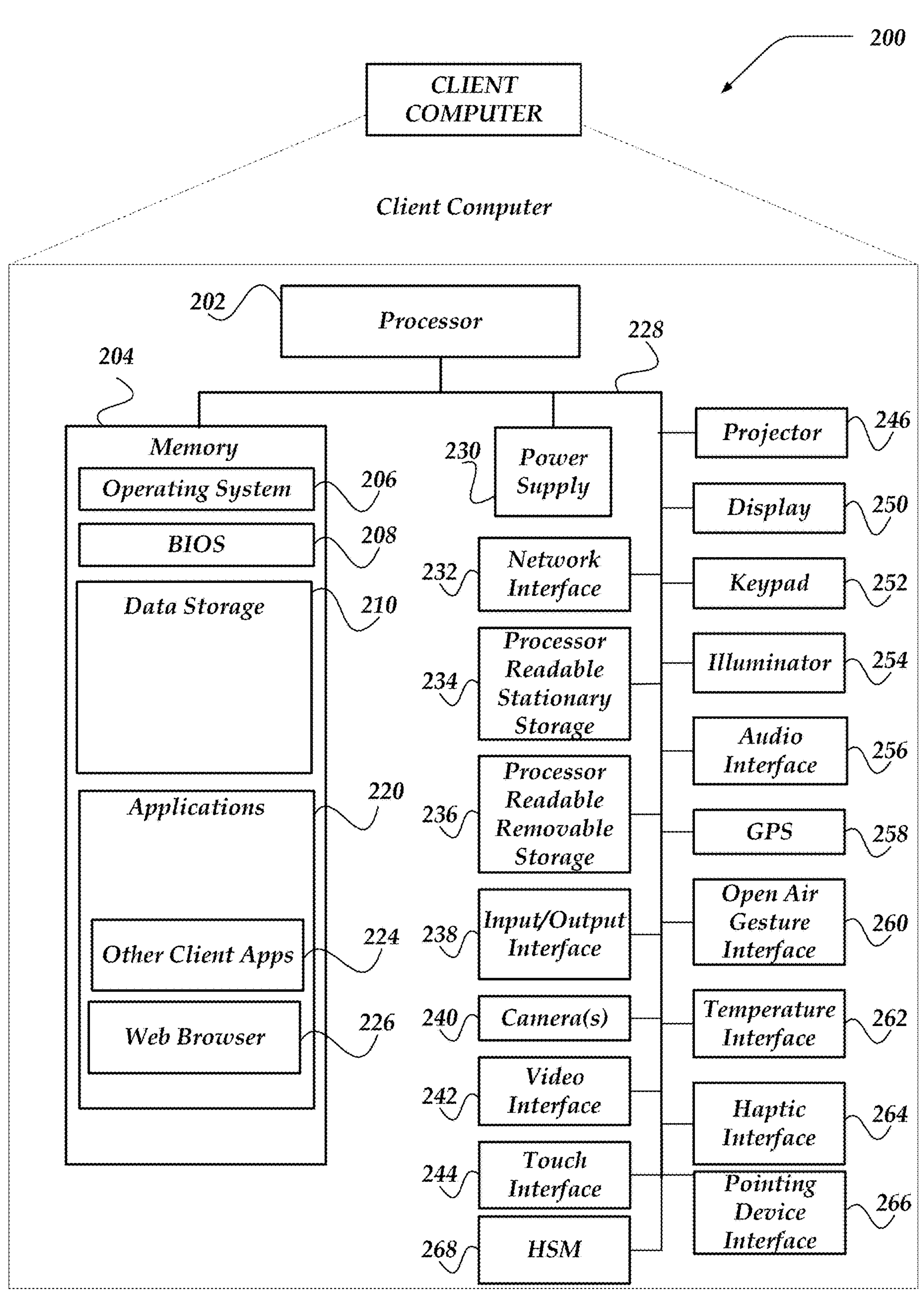
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to audio devices, pointing devices, keypads, displays, cameras, projectors, and the like. These peripheral components may communicate over a Pico Network such as Bluetooth, Zigbee, or the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by processors, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, alerts, log data, API calls, or the like, combination thereof, with application servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
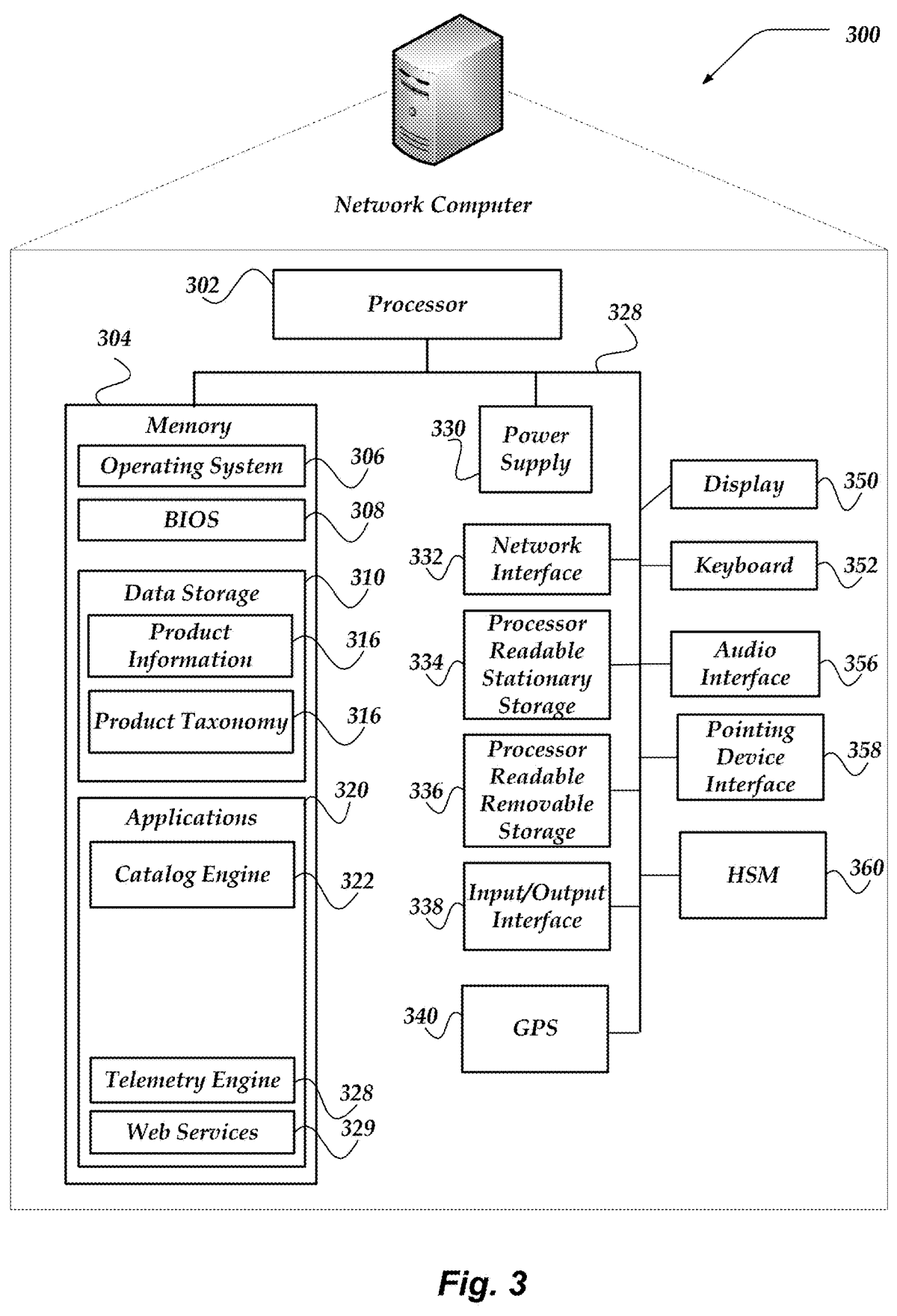

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of sales channel server computer 116, product information server computer 118 shown in FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300. In some embodiments, processor-readable stationary storage device 334 or processor-readable removable storage device 336 may be considered a processor or computer readable non-transitory storage media that includes instructions configured for adaptive product information platform in a computing environment such that execution of the instructions by one or more processors on one or more network computers performs actions described herein.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the network computer or client computers, including for example, a Media Access Control (MAC) address, IP address, and the like.

In at least one of the various embodiments, applications, such as, operating system 306, catalog engine 322, telemetry engine 328, web services 329, or the like, may be arranged to employ geo-location information to select one or more localization features, such as, time zones, languages, currencies, calendar formatting, or the like. Also, localization features may be used when interpreting network traffic, application protocols, user-interfaces, generating reports, monitoring infrastructure access in different regions, or the like. Localization may be employed by one or more internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, product information 316, product taxonomy, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include catalog engine 322, telemetry engine 328, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, catalog engine 322, telemetry engine 328, web services 329, or the like, may be operative in a cloud-based computing environment. In one or more of the various embodiments, these applications, and others may be executing within virtual machines or virtual servers that may be managed in a cloud-based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to catalog engine 322, telemetry engine 328, web services 329, or the like, may be provisioned and decommissioned automatically.

Also, in one or more of the various embodiments, catalog engine 322, telemetry engine 328, web services 329, or the like, may be located in virtual servers running in a cloud-based computing environment rather than being tied to one or more specific physical network computers. Likewise, in some embodiments, one or more of catalog engine 322, telemetry engine 328, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
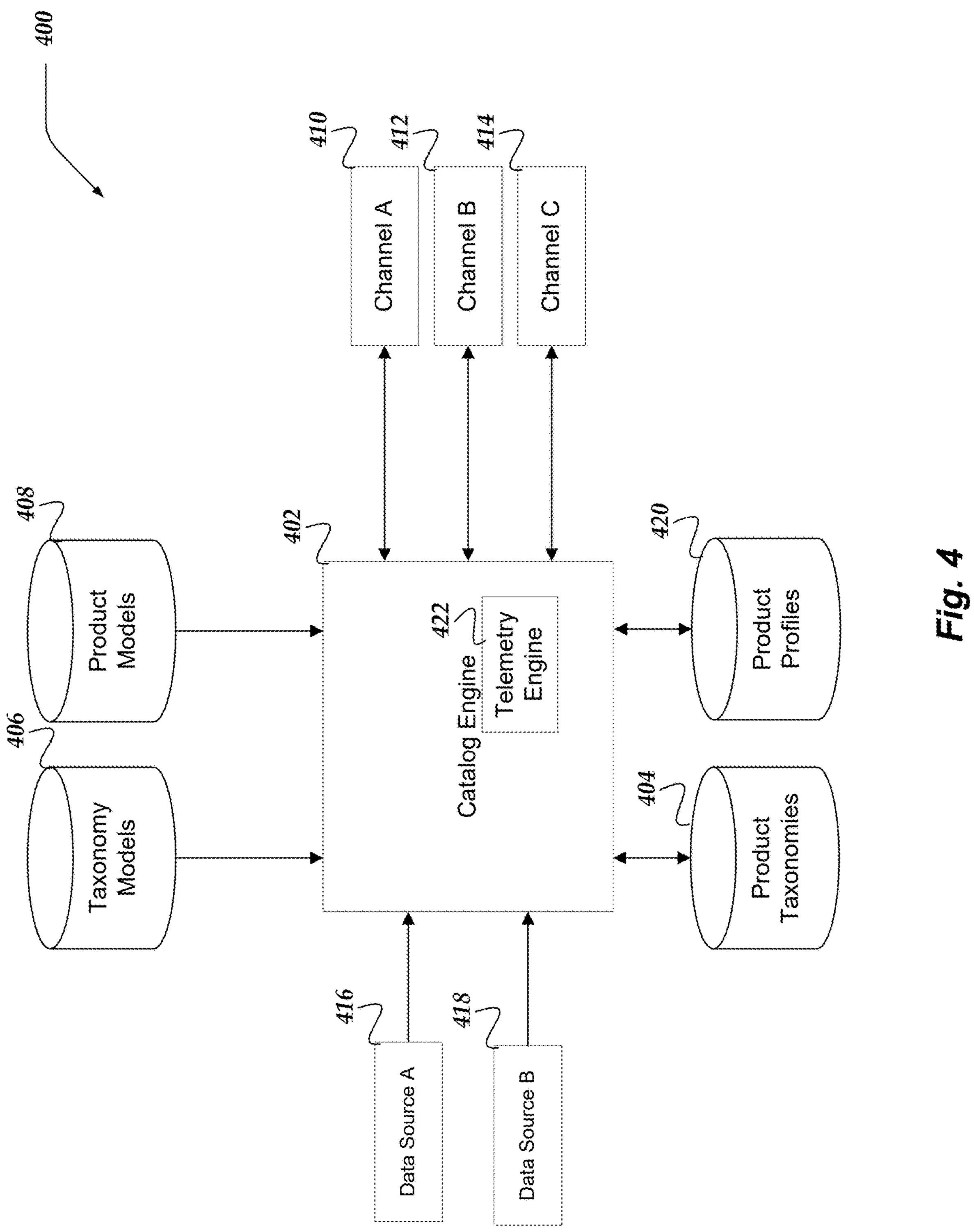
FIG. 4 illustrates a logical architecture of a system for adaptive product information platforms in accordance with one or more of the various embodiments.

FIG. 4 illustrates a logical architecture of system 400 for adaptive product information platforms in accordance with one or more of the various embodiments. In some embodiments, product information servers may include one or more catalog engines, such as catalog engine 402. In some embodiments, catalog engines may be arranged or configured to perform various actions for adaptive product information platform as disclosed herein. Further, in some embodiments, catalog engines may be arranged to use one or more components including: one or more product taxonomies, such as product taxonomies; one or more taxonomy models, such as taxonomy models 406; one or more product models such as product models 408; or the like. Further, in some embodiments, system 400 may include a plurality of catalog channels, such as channel 410, channel 412, channel 414, or the like. Also, in some embodiments, catalog engines may be arranged to integrate with one or more external product or marketing data sources, such as data source 416, data source 418, or the like.

In some embodiments, catalog engines may be arranged to use product models with product taxonomies to generate product profiles that include product description content. In some embodiments, product profiles may be stored in data stores such as product profiles 420 that may be distributed to one or more catalog channels or other digital sales channels.

Further, in some embodiments, catalog engines may be arranged to use one or more taxonomy models to generate the one or more product taxonomies. For example, for some embodiments, channels may include one or more of an e-commerce stores, online advertising platforms, AI based search engines, recommendation sites, online marketplaces, or the like.

In some embodiments, different product taxonomies may be directed to different product types based on the particular characteristics or features of the given product types. In some embodiments, product taxonomies define the plurality of attributes that may be used to characterize particular products. In some embodiments, each attribute may be associated with values that are relevant to the particular product type. For example, for some embodiments, if the product type may be a clothing item such as dress, attributes may include size, color, length, hem, neckline, or the like. Note, many product types (especially clothing types) may have some or all of the same attributes. In some embodiments, product types may be considered an unbounded set that may expand as new products may be created or existing products may be reclassified. Also, in some embodiments, within a product taxonomy one or more product types may be organized hierarchically such that a broader product type, such as women's clothing may be a parent product type for other product types such as dress, shirts, shoes, or the like, where each sub-type or child-type may be associated with further sub-types or child-types depending on the products involved. In some cases, one or more products may be associated with different product types, such as fashion item that may be directed to men (e.g., men's clothing) and women (e.g., women's clothing) simultaneously.

In some cases, for some embodiments, values for attributes may be organized hierarchically such that a broader value may be considered a parent of other more specific values. For example, in some embodiments, if a product type has color attribute, the color blue may be considered or represented as the parent value for other color hues that may be considered blue.

In some embodiments, product taxonomies may declare attribute values that may be considered synonyms that represent the same attribute. Also, in some embodiments, attribute values may include terms that may become associated with one or more attributes rather than being limited to values that literally mean the same thing. For example, in some embodiments, a non-standard term may evolve to having a meaning that may be associated with particular attributes or attribute values. Accordingly, in some embodiments, such terms may be included in product taxonomies.

In some embodiments, catalog engines may be arranged to generate product taxonomies based on industry standards or references. Also, in some embodiments, product taxonomies may be expanded or updated based on various other information sources, here represented as external data source 416 or external data source 418. In some embodiments, external data sources may include specialized or dedicated product information sources, such as those provided by industry standards bodies, government agencies, certification associations, accreditation associations, retail associations, marketing associations, or the like. Also, in some embodiments, external data sources may include streams or feeds associated with industry journals, popular publications (e.g., consumer directed fashion magazines), social media, user/customer direct input/feedback, or the like.

Accordingly, in some embodiments, catalog engine may be arranged to use taxonomy models to determine if existing entries may be modified or updated. Likewise, in some embodiments, catalog engines may be arranged to fit new terms (e.g., attributes or attribute values) into product taxonomies. For example, in some embodiments, if new term for describing an attribute enters popular usage, catalog engine may be arranged to update the relevant product taxonomies.

In some embodiments, catalog engines may be arranged to generate product profiles that include product description content for particular products based on the individual characteristics of the particular product and the current product taxonomy associated with the type of product. In some embodiments, product models may be configured to be constrained by the relevant product taxonomies. Thus, in some embodiments, catalog engines may be arranged to use product models to generate product profiles that include product description content that may be constrained by the appropriate taxonomy. Among other things, this may restrict product description content to the curated product type attributes and attribute values declared in product taxonomies enabling consistent ore comprehensive product content that channels may use for describing or surfacing products for their customers.

Accordingly, in some embodiments, catalog engines may be arranged to communicate the product description content to one or more channels for display in their catalogs or product displays. In some embodiments, the product description content may be used supporting search queries provided by customers or other services. In some embodiments, catalog engines may be arranged to format or shape the product description content to match the requirements of the particular channels. Thus, in some embodiments, catalog engines may be arranged to load instructions, templates, libraries, plug-ins, extensions, or the like, from configuration information to use for formatting product description content for particular channels.

In some embodiments, catalog engines may be arranged to integrate with one or more channels such that the catalog engine may be provided feedback related to how the channel or its users (e.g., customers) interact with the product description content for the various products. This feedback may include metrics associated with search terms, search hits/matches, conversions, or the like generated by the channel platform. Also, in some embodiments, telemetry engines may be configured to collect information related to how users may physically interact with product description content. Likewise, in some embodiments, feedback may include user review feedback that may be actively collected by channels. In some embodiments, catalog engine may be arranged to associate one or more metrics or other product related feedback with its associated product description content. Accordingly, in some embodiments, information associated with product content interaction or effectiveness may be associated with the product profile for product type or product of interest.

In some embodiments, catalog engines may be arranged to identify product-specific identifiers, model numbers, or proprietary naming conventions that customers frequently use in search queries but may not be present in existing product descriptions. For example, if customers frequently search for a specific model number or branding that may not be included in current product titles or descriptions, the system may detect this search pattern through channel feedback and automatically enrich the relevant product profiles with the identified model number, product code, or branding information. Accordingly, in some embodiments, catalog engines may be arranged to update product content across multiple channels to include these discovered product identifiers, thereby improving product discoverability for customers using specific or emergent product nomenclature.

Further, in some embodiments, catalog engines may be arranged to selectively apply knowledge gained from one channel to other channels based on individual channel capabilities and constraints. For example, for some embodiments, if customer behavior analysis reveals that a specific color variation (e.g., "teal") is highly popular on one channel, catalog engines may be arranged to evaluate whether this information should be applied to other channels based on their respective limitations. In some embodiments, if a particular channel constrains color selections to a predetermined set of values, catalog engines may be arranged to map the discovered color preference to the closest available option within that channel's constraints, or may determine that the information is not applicable to that specific channel. Accordingly, in some embodiments, this selective intelligence transfer may improve content distribution while respecting individual channel requirements and limitations.

Also, in some embodiments, catalog engines may be arranged to receive feedback information directly from channel owners or operators rather than being limited to feedback associated with customers or users of the channels. For example, in some embodiments, channel operators may identify brand restrictions, localization issues, one or more local preferences, license issues, or the like that may be communicated to catalog engines using direct forms of communication such as email, text messages, or the like as well as via one or more integrated interfaces or APIs.

In some embodiments, catalog engines may be arranged to continuously update product description content (included in product profiles) based on changes made to product taxonomies. For example, catalog engines may be arranged to update product taxonomies based on dynamic market trends. Accordingly, in some embodiments, catalog engines may be arranged to update existing product description content or generate new product description content based on the updates to product taxonomies or product profiles. In some embodiments, the updated product description content may be automatically pushed out to channels such that they include the updated product description content in their catalogs. Note, in some embodiments, individual organizations or channel may restrict or limit collection of information or metrics associated with product description content on their channels. Accordingly, in some embodiments, catalog engines may be arranged to use rules, instructions, or the like, to enable individual channels to define the level integration allowed for catalog engine.

Also, in some embodiments, catalog engines may be arranged to include or integrate with one or more telemetry engines, such as telemetry engine 422. In some embodiments, telemetry engines may be arranged to collect metrics, information (e.g., telemetry metrics) about how customers, users or others may interact with presentations or user interfaces generated by catalog engine. In some embodiments, this telemetry may be used among other things for adapting user interfaces or reports based on the collected telemetry metrics. Telemetry engines are described in more detail below.

In contrast, conventional catalogs may require manual updates to keep their product information up to date. Also, conventional catalog information may omit or misclassify attributes or attribute values that would otherwise improve how customers find their products.

Also, conventional AI-based content generation systems often suffer from inconsistent or inaccurate output, commonly referred to as "hallucination," where the system generates plausible-sounding but factually incorrect information. Such systems may produce different results for identical inputs and lack mechanisms to ensure consistency or accuracy of generated content. This unpredictability may often render conventional AI systems unsuitable for commercial catalog applications where accuracy and consistency are critical for customer trust and business operations. Accordingly, there exists a need for AI-based catalog systems that provide controlled, consistent, and accurate product information generation while leveraging the benefits of advanced machine learning and natural language processing technologies.

FIG. 5 illustrates a logical schematic of product taxonomy 500 for adaptive product information platform in accordance with one or more of the various embodiments.

In some embodiments, catalog engine product taxonomy may be arranged to generate or maintain a plurality of product taxonomies for relevant product types that may be presented. In some embodiments, the available types represented by product taxonomy may be considered to be dynamic. Because, in some embodiments, as new products may be developed or encountered in the relevant marketplaces, new product types may emerge either by active industry declaration or by organics means. In this example, active industry declaration may include if industries (e.g., industry marketing groups, industry standards associations, or the like) explicitly define new product types. Also, in this example, organic means may include product types that arise through unofficial use or communications. For example, new product types may emerge from casual consumer communications, social media, celebrity communications, or the like. For example, a celebrity may refer to a particular bag/purse having certain features as her beach bag. Thus, for example, the product type "beach bag" may emerge as a new or separate product type.

In this example, node 502 may represent a product type while node 504, node 506, or node 508 may be considered to representing product attributes. With collection 510 or collection 512 represent other product attributes with the rectangle portion representing the many possibilities that may be present depending on the product type.

In some embodiments, attributes represented in product taxonomy may be specific to the particular type. Further, in some embodiments, some attributes may be available for some values of related attributes. For example, if the product type may be a drink, the type of drink may include or exclude one or more attributes. For example, if the drink may be a Fruit Juice drink it may be associated with different attributes that a Vegetable Juice drink or a Coffee drink. However, some attributes may be shared depending on the product type or known product attributes.

In some embodiments, some attributes or attribute values may be mutually exclusive or dependent on one or more other attributes or attribute values. For example, a product type such as juice may have a dozen attributes where some attributes or attribute values may be mutually exclusive or some may be dependent on one or more other attribute values. For example, a particular flavor category may be an attribute. Accordingly, in this example, the flavor value, such as Kombucha may activate another level of sub-attribute such as Kombucha Flavor which may represent the particular Kombucha flavor. In this example, Kombucha Flavor attributes or attribute values may not be available for a Fruit Juice product type.

Also, in some embodiments, catalog engines may be arranged to associate synonyms with various attribute values. In some embodiments, one or more attribute values may be associated one or more dependent values where superior attribute value (the parent of the dependent attribute value) may be considered a broader term that encompasses the dependent values. For example, attributes such as “color”, may have a base set of available values, such as red, blue, white, green, orange, and so on. However, in some embodiments, each base value may be associated with one or more levels of dependent values such as particular hues of the base colors (e.g., teal, navy blue, baby blue, cyan, or the like). Further, in some cases, for some embodiments, an attribute such as color may have several levels of detail represented in product taxonomy. For example, the color teal may be associated with another value set that may include different hue labels that represent teal or teal-like colors, such as jade teal, steel teal, or the like. In practice, especially in many domains, there may often be two or more levels of detail or specificity represented for attribute values. Also, in some embodiments, catalog engines may be arranged to associated one or more attribute values in product taxonomies with synonyms if appropriate. In some embodiments, particular attributes value or synonym values may be trade names, regional slang, brand names, or the like. For example, a screwdriver or conforming fasteners may have an attribute, such as drive type may have synonym values such as Phillips head or cross-head. In some cases, one or more of the synonyms values may be more relevant in particular channel contexts.

Further, in this example, for brevity and clarity product taxonomy 500 may be represented here as a tree or tree-like data structure. However, one of ordinary skill in the art will appreciate that the innovations disclosed herein are not so limited. Accordingly, in some embodiments, catalog engines may be configured to represent product taxonomies using one or more other data structures or data formats to represent attributes or attribute values and the relationships between or among them.

Figure 6:
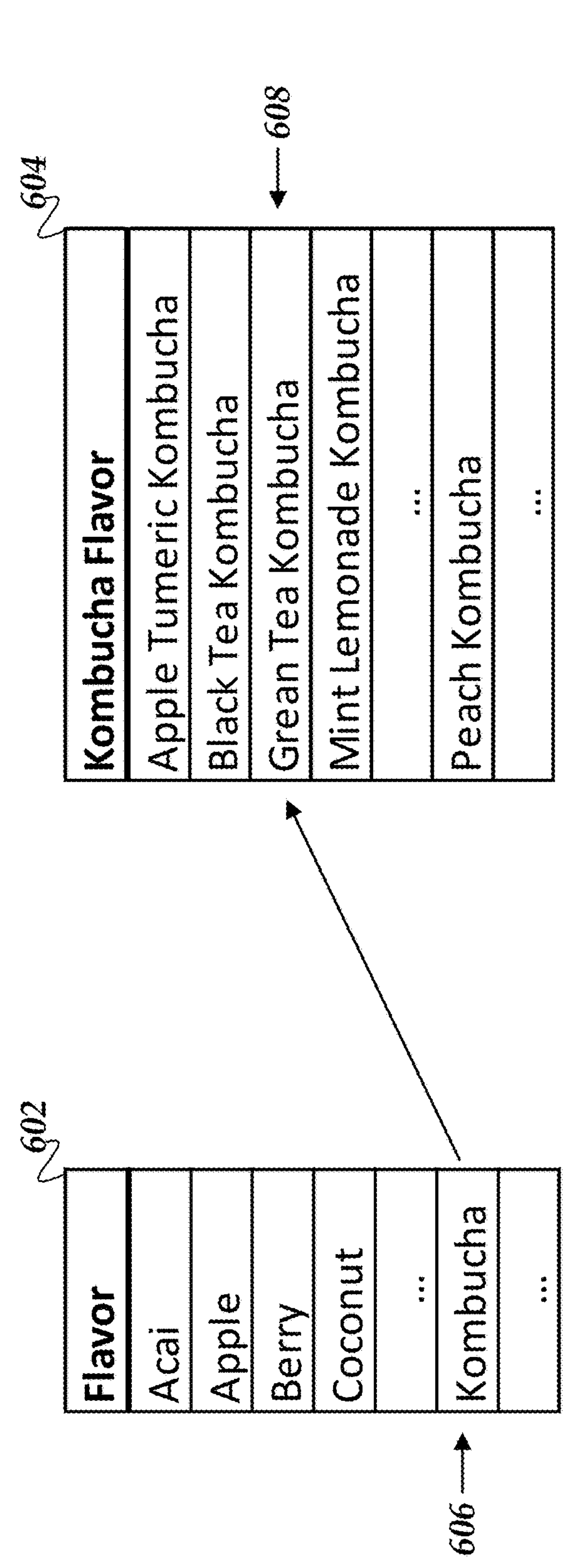
FIG. 6 illustrates a logical schematic of a portion of a product taxonomy for adaptive product information platforms in accordance with one or more of the various embodiments.

FIG. 6 illustrates a logical schematic of a portion of product taxonomy 600 for adaptive product information platform in accordance with one or more of the various embodiments.

As described above, in some embodiments, product taxonomies may be considered data structures that represent attributes or attribute values for a particular product type. In some embodiments, some attributes may be associated with two or more levels of detail, specificity, or precision for those attribute values. Accordingly, in some embodiments, one or more collections or sets of attribute values may be considered to be dependent on a value of another attribute that may be hierarchically superior.

Similarly, in some embodiments, one or more attributes themselves may be dependent on one or more values of hierarchically superior attributes. Accordingly, in some embodiments, such dependent attributes may be considered to be activated or enabled if their superior attribute has one or more particular values.

In this example, for some embodiments, product taxonomy portion 600 includes table 602 which includes values for the attribute “flavor” for a product type such as fruit juice, or the like. Similarly, for some embodiments, table 604 represents a collection of flavors that provide more specificity. In this example, row 606 indicates that if a product type is a juice with the flavor of “Kombucha” there are more specific flavors of Kombucha that may represent the specific Kombucha juice drink product type. For example, for some embodiments, row 608 indicates that a product type with flavor attribute value of Kombucha may be further refined or described using one or more attribute value from table 604.

Note, while this example illustrates two levels of detail, one of ordinary skill in the art will appreciate that the number of levels may vary from one to many depending on the particular attribute and product type.

Figure 7:
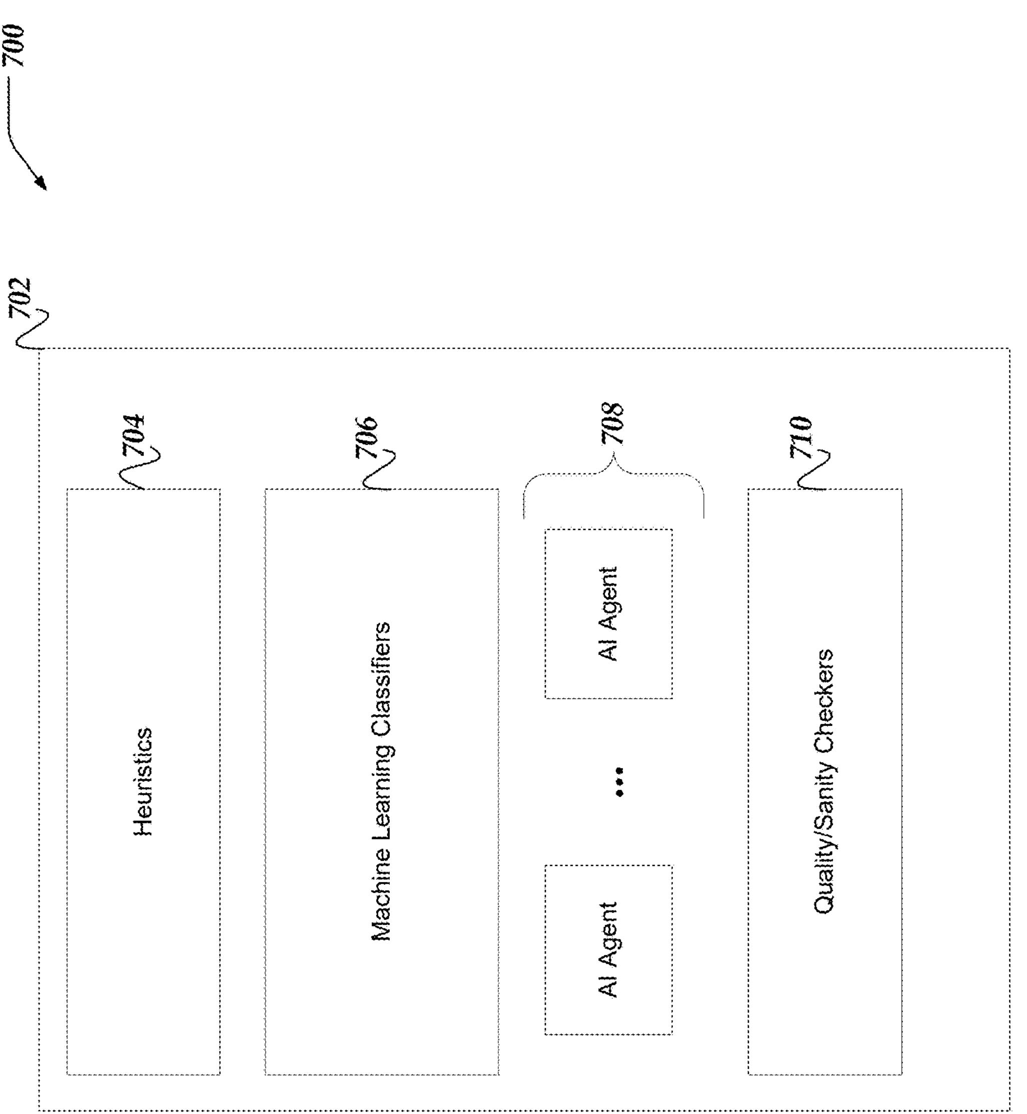
FIG. 7 illustrates a logical schematic of a model for adaptive product information platforms in accordance with one or more of the various embodiments.

FIG. 7 illustrates a logical schematic of model 700 for adaptive product information platform in accordance with one or more of the various embodiments. As described above, catalog engines may be arranged to use specialized models for various tasks. In some embodiments, catalog engines may be arranged to use models, such as taxonomy models, product models, or the like. In this example, generic model 700 may be presented here to facilitate a discussion of the different types on models used be catalog engines.

In some embodiments, models, such as model 700 may comprise one or more components or sections such as model container 702, heuristics section 704, machine learning classifier section 706, AI agent section 708, quality/sanity check section 710, or the like. In some embodiments, models may include more or fewer sections without departing from the scope of the inventions. Likewise, in some embodiments, model sections may be positioned or utilized in a different order than depicted herein. Further, in some cases, some actions, such as quality checks, confidence scoring or the like associated with models or model outputs may be performed by catalog engines rather than being explicitly part of a model.

In some embodiments, model containers, such as model container 702 may be the data structure used for associated the various parts of a particular model. In some embodiments, different model types may share one or more of the same sections or section portions depending the configuration of the models. For example, AI agents for different model type may share agent frameworks, interfaces to generative AI models, prompt templates, or the like. Likewise, in some embodiments, models may be configured to share some or all NLP libraries, one or more machine learning classifiers, or the like. Accordingly, in some embodiments, model container 702 may include references to rules, instructions, libraries, or the like as well as local/specialized instructions for the particular model.

In some embodiments, heuristic sections, such heuristic section 704 may be configured to include rules, instructions, or the like that are specialized for particular product types, exceptions, special cases, or the like. Note, in this example, heuristic section 704 is depicted in the first position, however, it may be assumed the particular heuristics may be applied at any relevant time rather than being restricted to being the first actions.

In some embodiments, machine learning classifier section 706 may be configured to include one or more classifiers that have been trained to recognize or classify various features for the particular model. For example, one or more machine learning classifiers used in taxonomy models may be trained to perform NLP to identify terms that may be candidates for including in taxonomy models. Also, for example, one or more machine learning classifiers used for product models may be trained to recognize various features of products such that the features may be identified from photographs or video.

In some embodiments, agent section 708 may represent that a model may include or reference one or more AI agents to perform various prompt driven tasks. In some embodiments, agents may be considered to portions of the model that exercise generative AI or large language model rather than being strictly limited to being considered an agent. In some embodiments, agents may be used for interacting with custom tune generative AI model as well as for interacting with external or third-party generative AI model via interfaces or APIs. In some cases, models may be configured to employ specialized prompt templates that may be used to generate prompts for particular tasks.

In some embodiments, quality check section 710 may represent instructions that a model may use to perform various quality or sanity checks before providing the output of the model to the catalog engine.

In some embodiments, catalog engines may be arranged to dynamically configure models by selectively including participial sections or section content depending on the current task or purpose of the model.

In some embodiments, catalog engines may be arranged to evaluate the performance of models based on one or more success/confidence scores, user feedback, telemetry metrics, or the like. Accordingly, in some embodiments, catalog engines may be arranged to track performance history of the various models.

In some embodiments, catalog engines may be arranged to implement confidence scoring mechanisms to validate the accuracy of attribute predictions and content generation. In some embodiments, models may be configured to assign confidence scores to identified attributes or attribute values based on factors such as input data quality, consistency across multiple analysis methods, historical accuracy rates, validation against known standards, or the like. Accordingly, in some embodiments, catalog engines may be arranged to apply one or more threshold-based validation processes to ensure that attribute predictions meet predetermined confidence levels before including them in product profiles. In some embodiments, catalog engines may be arranged to implement multiple validation stages, cross-reference predictions across different model types, or require manual review for predictions below specified confidence thresholds to improve accuracy levels.

In some embodiments, taxonomy models may be arranged to perform various tasks associated with generating or managing product taxonomies. In some embodiments, this may include processing information from various internal or external content sources to identify attributes or attribute values that may be appropriate for a given product type. Also, in some embodiments, taxonomy models may be tuned to evaluate the current organization of a product taxonomy and perform or recommend organizational changes in view of changing product information or user feedback/telemetry.

In some embodiments, product models may be arranged to perform various tasks associated with generating, updating, or managing product profiles for various product types based on a particular product and its associated product taxonomies. In some embodiments, catalog engines may be arranged to be provided one or more photographs product types that may be evaluated by product models to generate corresponding product profiles. Also, in some embodiments, product models may be configured to employ text information, such as manufacture specifications, natural language production descriptions, or the like for determine information to include in product profiles. In some embodiments, catalog engines may be arranged to use product models to update product profiles if there may be changes or updates to the associated product taxonomies. Likewise, in some embodiments, if updated product photographs or product information may be provided, product models may be employed to update existing product profiles.

Figures 8A, 8B:
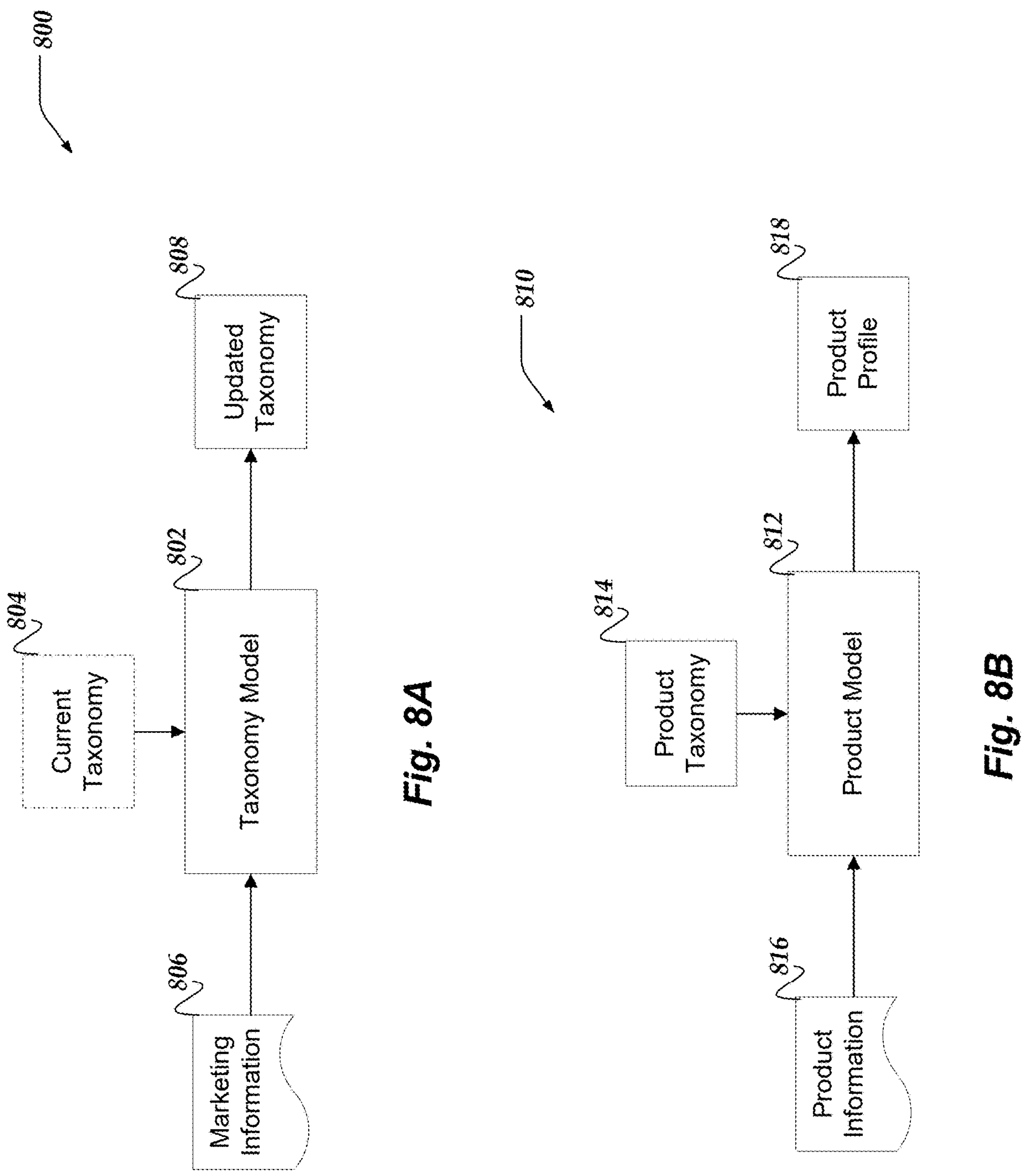
FIG. 8A illustrates a logical schematic of a system for updating or generating product taxonomies for adaptive product information platforms in accordance with one or more of the various embodiments.
FIG. 8B illustrates a logical schematic of a system for generating product profiles for adaptive product information platforms in accordance with one or more of the various embodiments.

FIG. 8A illustrates a logical schematic of system 800 for updating or generating product taxonomies for adaptive product information platforms in accordance with one or more of the various embodiments.

As described above, in some embodiments, catalog engines may be arranged to use taxonomy models to generate or update product taxonomies. Accordingly, in some embodiments, taxonomy models such as taxonomy model 802 may be arranged to receive input data, such as marketing information 806. Accordingly, in some embodiments, taxonomy model 802 may be configured to generate a product taxonomy, such as product taxonomy 808 based on marketing information 806. In some embodiments, catalog engines may be arranged to update an existing product taxonomy, such as current product taxonomy 804 based on marketing information 806. Note, in this example, current taxonomy 804 is represented using dashed lines because in some cases an existing current product taxonomy may not exist.

As described above (FIG. 7), in some embodiments, taxonomy models may be hybrid models that includes two or more different type of sub-models or instruction collections (e.g., model sections) that may be specialized for recognizing or infer candidate product type attributes or attribute values. For example, in some embodiments, marketing information 806 may be considered to be documents or streams that include one or more of fashion reports, celebrity style reports, industry reports, new product announcements, catalog feeds, social media, or the like.

In some embodiments, marketing information may be received from various external data sources, such as social media platforms, fashion industry publications, celebrity style reports, trend forecasting services, real-time cultural commentary feeds, or the like. For example, in some embodiments, catalog engines may be arranged to monitor fashion-related social media channels, industry influencer content, style magazines, or entertainment media to identify emerging terminology, trending descriptors, cultural associations that may be relevant to product categorization and description, or the like. In some embodiments, marketing information may be obtained through automated social media monitoring, fashion industry RSS feeds, entertainment news aggregation services, specialized trend analysis platforms, or the like.

Further, in some embodiments, marketing information may include feedback information from one or more channels. In some embodiments, this may include one or more of search history, search result history, sales conversion history, customer success/failure feedback, customer reviews, channel owner feedback, or the like. Accordingly, in some embodiments, adaptive product information platform may be enabled obtain real-time direct feedback related to how effective the current attributes or attribute values may be for a given product type or sales channel. In some embodiments, taxonomy models may identify search terms that should be added to product taxonomies as attribute values.

Accordingly, in some embodiments, taxonomy models may be arranged to employ various techniques to infer if marketing information 806 includes information that may be relevant to existing product taxonomies or may merit the generation of a product taxonomy. In some embodiments, such methods may include one or more of heuristics, semantic NLP, machine learning classifiers, AI agents, or the like that may be tuned or trained to recognize terms that may be relevant for describing or searching for the product type.

In some cases, for some embodiments, marketing information 806 may include one or more photographs, video clips, or the like. Accordingly, in some embodiments, taxonomy models may include sub-models that use machine vision to identify the features of the products in the photographs or video. For example, in some embodiments, a taxonomy model tuned for the product type dress, may include machine learning classifiers that are trained to recognize the physical features of the dress, including one or more of neckline, skirt length, color, fabric patterns, or the like.

Further, in some embodiments, taxonomy models may be configured to infer transient attribute values based on popular social commentary. For example, a gossip/social publication may describe the clothes or fashion accessories worn by a celebrity at a recent event. In some embodiments, transient attributes may be associated with product types along with aging or timeout information that may determine if the transient attribute values may remain relevant.

In some embodiments, in many cases, it may be more likely that new attribute values may be determined from the various input sources that provide data to taxonomy models. However, in some cases, for some embodiments, taxonomy models may identify new or emerging attributes that may be added to a product taxonomy. Also, in some embodiments, taxonomy models may be configured to continuously or periodically evaluate product taxonomies to determine if they may be improved by reorganization. For example, in some embodiments, one or more independent attribute values, may be converted into dependent values. Likewise, in some cases, one or more dependent attribute values may be reorganized as an independent attribute value. For example, in some embodiments, a flavor of a juice, such as Lime, that was initially considered an independent flavor value may be organized to be a dependent value under the flavor Citrus (alongside, Orange, Lemon, Grapefruit, or the like) as represented in its product taxonomy.

In some embodiments, catalog engines may be arranged to identify emerging product associations based on popular culture references, celebrity endorsements, or media coverage. For example, if a celebrity wears a particular style of watch at a public event, and users subsequently search for queries such as "[celebrity name] watch," the system may detect zero search results for such queries. Accordingly, in some embodiments, taxonomy models may be arranged to research the cultural reference, identify the specific product characteristics associated with the celebrity (e.g., chronograph style), and update relevant product profiles to include appropriate cultural association attributes. In some embodiments, this enables products with similar characteristics to be discoverable through culturally relevant search terms, even when the exact celebrity-endorsed product is not available in the catalog.

Similarly, in some embodiments, catalog engines may be arranged to identify one or more attribute values as transient attribute values based on their appearance in product information or marketing information for various product types. Accordingly, in some embodiments, if a new attribute value may be discovered or detected, catalog engines may infer that one or more of the new attributes may be transient. For example, in some cases, a discovered attribute value (or associated search terms, or the like) may be associated with a transient event, such as a popular sporting event. Thus, as time passes after the conclusion of the event, the transient attribute value may become less relevant.

In some embodiments, catalog engines may be configured to associate an indicator, such as flag, tag, or the like, with transient attribute values to enable transient attribute values to be explicitly tracked such that they may be deliberately removed from taxonomies based on one or more conditions, such as aging, or the like.

Also, in some embodiments, rather than explicitly tracking or classifying attribute values as transient attribute values, catalog engines may be arranged to automatically remove or deemphasize transient attribute values based on signals determined from the product information, marketing information, channel information, or the like. Accordingly, in some embodiments, as taxonomies may be continuously updated based on relevant information sources, transient attribute values may naturally be observed to be less relevant as time passes. Thus, in some embodiments, because catalog engines may be arranged to continuously update taxonomies, transient attribute values that lose relevance may be automatically removed from taxonomies.

FIG. 8B represents a logical schematic of system 810 for generating product profiles for adaptive product information platforms in accordance with one or more of the various embodiments.

As described above, in some embodiments, catalog engines may be arranged to generate product profiles, such as product profile 818 that include attributes and attribute values for a particular product type. In some embodiments, catalog engines may be arranged to use one or more product models, such as product model 812 to generate or update product profiles based on product information 816.

In some embodiments, product information 816 may be assumed to be similar to marketing information 806 described above. However, in some embodiments, it may be more likely that the product information is associated with a particular product type rather than media or content about fashion trends, industry trends, or the like. In some embodiments, product information may be obtained from internal product catalogs of retailers or manufacturers. For example, for some embodiments, an online shoe retailer may provide a data dump of their product catalog. Also, in some embodiments, catalog engines may be arranged to integrated with one or more retailers or manufacturers such that product information may be sent or streamed as it is created or modified. Accordingly, for example, if a new shoe is being added to their product catalog, the product information that new shoe may be sent to the adaptive product information platform. Thus, in some embodiments, catalog engines may select the appropriate product model and generate a new product profile based on the selected product model and product information.

Further, in some embodiments, transient attribute values may be added or removed from product profiles as those transient attribute values may be added or removed from relevant taxonomies.

FIG. 9 illustrates a logical schematic for system 900 for adaptive product information platform in accordance with one or more of the various embodiments. As described above, in some embodiments, catalog engines may be arranged to obtain product information and generate a corresponding product profile. In some embodiments, product profiles may be generated based on the provided product models, product taxonomies, and the product information.

In this example, for some embodiments, catalog engine 902 may be provided product information 904 which may be considered to be product information from a retailer catalog database. As described above, in some embodiments, catalog engines may be arranged to obtain the product information automatically via streaming interfaces, batch downloads, APIs, interfaces, or the like.

Accordingly, in some embodiments, catalog engines may be arranged to generate product profiles such as product profile 906. In this example, it may be assumed that the attributes and attribute values in product profile 906 conform to a men's shoe product taxonomy. As shown in this example, product profiles may be considered enriched such that they include information that may be advantageous for enabling customers to find the product using searches. Similarly, in some embodiments, product profile 906 may be used for other channels, such as advertisement distribution platforms, or the like.

Generally, in some embodiments, product profiles may include more attributes than any particular channel may use. Accordingly, in some embodiments, catalog engine may be arranged to map or filter product profiles to conform to the requirements of a given channel. In some embodiments, catalog engines may be arranged to maintain separate product profiles for each relevant channel. Also, in some embodiments, product profiles may include one or more attributes that may be hidden from display such that they may be intended for use in search optimization or otherwise improve the search results for customers.

Note, one of ordinary skill in the art will appreciate that in production environments product information or product profiles may include more or fewer attributes. Accordingly, in this example, the number of attributes here may be considered to be abbreviated for brevity and clarity. However, these abbreviated representations are at least sufficient for disclosing the innovations included herein.

Figure 10:
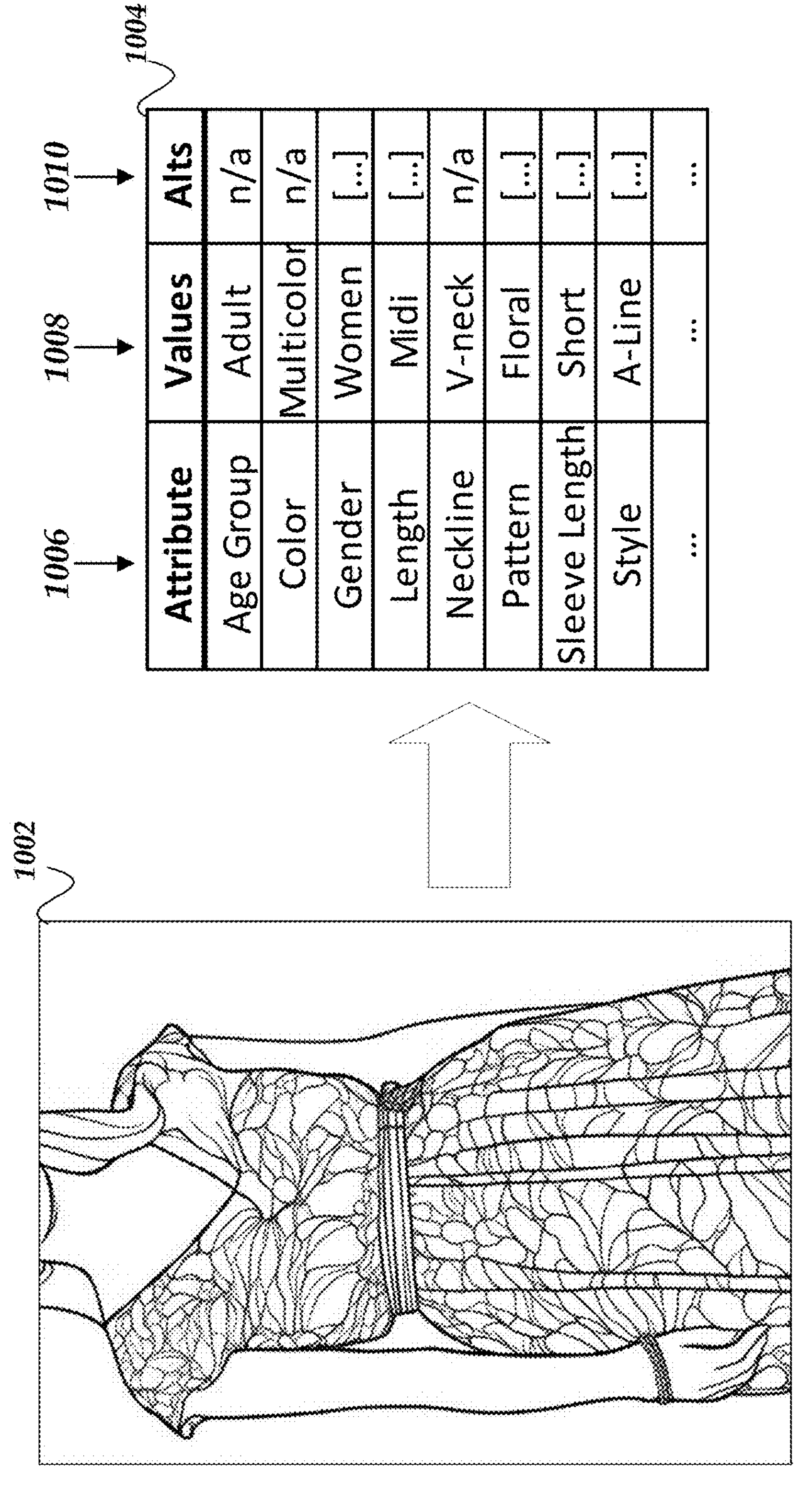
FIG. 10 illustrates a logical schematic of a system for generating product profiles from images for adaptive product information platforms in accordance with one or more of the various embodiments.

FIG. 10 illustrates a logical schematic of system 1000 for adaptive product information platform in accordance with one or more of the various embodiments.

As described above, in some embodiments, catalog engines may be arranged to generate product profiles from images or photographs of products. Accordingly, product models may include one or more machine vision components that may be tuned or trained for identifying or recognizing features of products or product types. Accordingly, in some embodiments, catalog engines may be arranged to map the one or more features to attributes that conform the relevant product taxonomy. Thus, in some embodiments, rather than letting product models generate profiles with ad-hoc or arbitrary attributes or attribute values, the attributes and values may be restricted to attributes or attribute values that are declared in the associated product taxonomy.

In this example, image 1002 may be considered to represent a photograph of a product type (a dress). Accordingly, in some embodiments, catalog engines may be arranged to use product models to generate product profiles, such product profile 1004 based on image 1002. In this example, product profile 1004 includes column 1006 for the attributes and column 1008 for the attribute values. Also, in some embodiments, as described above, product taxonomies may include one or more synonyms or alternate values for one or more attributes. In this example, for some embodiments, column 1010 represents a column of product profile 1004 the includes alternate or synonym attribute values if there may be any available.

Also, in some embodiments, catalog engines may be arranged to use additional photos, text descriptions, or the like, for generating product profiles rather than being restricted to one image as shown here. Further, one of ordinary skill in the art will appreciate that in production environments there may be more or fewer attributes than shown here depending on the particular product type or other local circumstances or requirements. Accordingly, in this example, the number of attributes here may be considered to be abbreviated for brevity and clarity. However, these abbreviated representations are at least sufficient for disclosing the innovations included herein. Further, in this example, product profile 1004 is represented as a table or table-like data structure. One of ordinary skill in the art will appreciate the innovations disclosed herein anticipate that other data structures or formats, such as database tables, XML files, lists, arrays, maps, dictionaries, or the like, may be used to represent product profiles.

Figure 11:
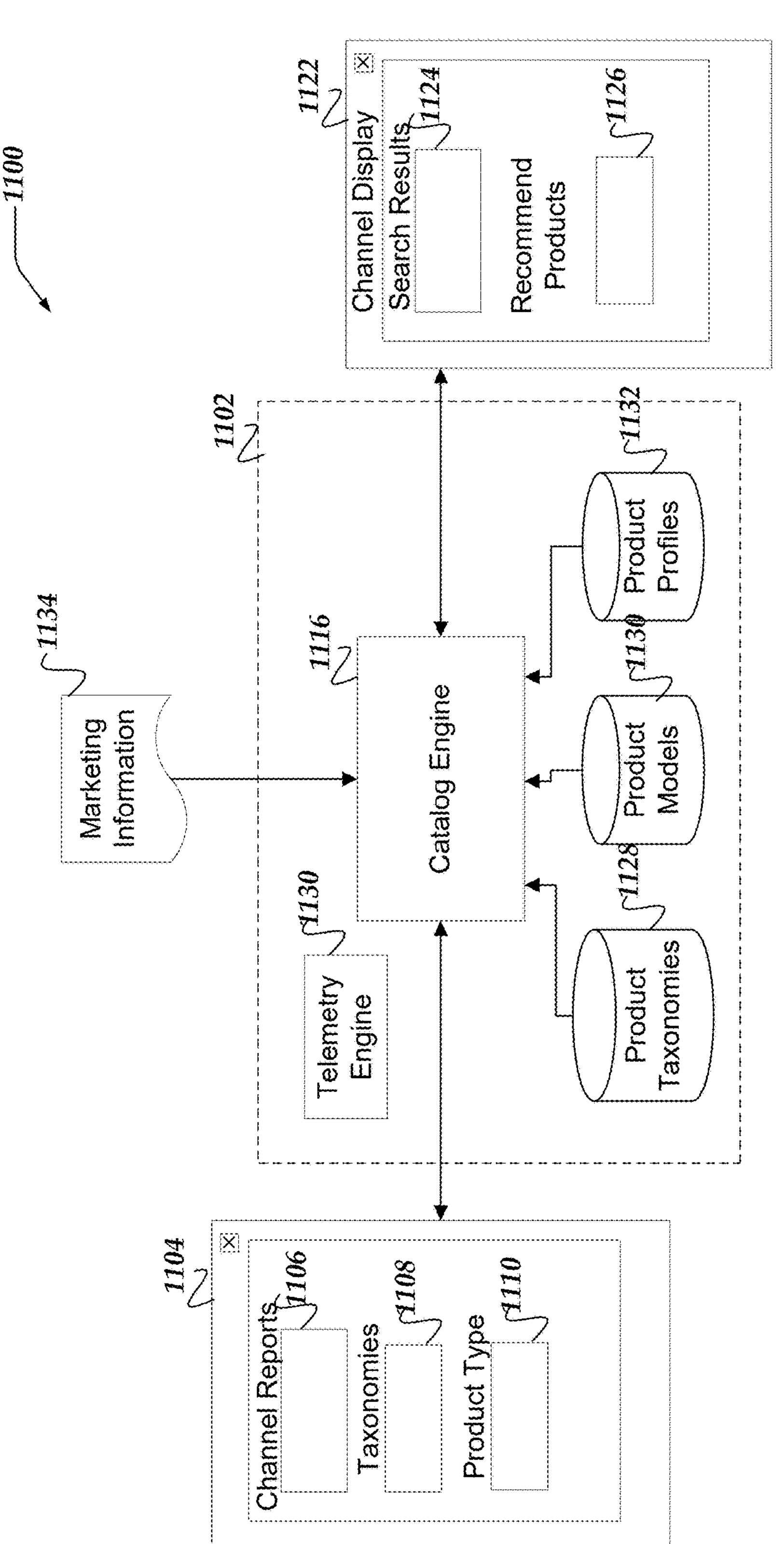
FIG. 11 illustrates a logical schematic of a system for adaptive product information platforms in accordance with one or more of the various embodiments.

FIG. 11 illustrates a logical schematic of system 1100 for adaptive product information platform in accordance with one or more of the various embodiments. As disclosed above, adaptive product information platforms may be arranged to receive marketing information, channel feedback, or other information that may be used to generate product taxonomies that may be employed with product models to generate product profiles that may be provided to one or more channels.

System 1100 may comprise various constituents, including: adaptive catalog information platform 1102, catalog engine 1116, product taxonomies 1128, product models 1130, product profiles 1132, telemetry engine 1130, or the like. Also, in some embodiments, user interface 1104 may represent an application that platform administrators or other users may use for viewing channel feedback or channel reports, viewing/reviewing one or more product taxonomies, view product profiles or product type information, or the like. Also, in this example, user interface 1122 may represent a channel associated application that may receive product profiles for use in online catalogs, or the like and report feedback (e.g., channel feedback) associated with user interactions with product profiles, product attributes, or results associated with product profiles.

In some embodiments, user interfaces, such as user interface 1104 or user interface 1122 may include various windows, controls, or other user interface features. In some embodiments, user interfaces may include various user interface panels, such as panel 1106, panel 1108, panel 1110, panel 1124, panel 1126, or the like. For example, in some embodiments, panel 1106 may represent a user interface that enables users, such as platform administrators, to upload or review reports that include channel feedback. Also, for example, panel 1108 may represent a user interface that enables users to select, edit, modify, or review one or more product taxonomies. Likewise, in some embodiments, panels such as panel 1110 may display the information associated with product types or product profiles.

Also, for example, for some embodiments, panel 1124 (in user interface 1122) may be considered a user interface that enables users to view product search results, product offerings, or the like providing a particular channel. For example, in some embodiments, if the application is an ecommerce shopping application, panel 1124 may include user interfaces that enable users to select items for purchase, review items included in an ecommerce shopping cart, or the like. Also, in this example, panel 1126 may represent a user interface for display the results (e.g., products) that may be recommended to the user based on products displayed in panel 1124. For example, if panel 1124 shows one or more items selected for purchase, panel 1126 may display information about other products that may be related to those items or similar search terms.

In some embodiments, catalog engines may be arranged to generate or display user interface 1104 or user interface 1122 to users using one or more of video interface 242, projector 246, display 250, or the like, of a client computer, such as client computer 200. Similarly, in some embodiments, catalog engine 1116 may be arranged to generate or display user interface 1104, or user interface 1122 to users using a one or more of input/output interface 338, display 350, audio interface 356, or the like, of a network computer, such as network computer 300.

In some embodiments, panel 1126 may be arranged to display a rank ordered list of recommended products based on the search results displayed in panel 1124. Note, in some embodiments, one of ordinary skill in the art will appreciate that organizations may have significant control or influence over the particular ranking criteria. For example, in some cases, one or more recommended products may be considered more important than others. Accordingly, in some embodiments, some items, products, product recommendations, shopping results, or the like may be associated with different sort order weights.

In some embodiments, catalog engines may be arranged to collect various telemetry or other metrics associated with user interactions with user interfaces. In some embodiments, telemetry may include tracking or monitoring if users may be in agreement with recommendations, search results, product profiles, product taxonomy entries, or the like. In some embodiments, catalog engines may be enabled to employ telemetry information or telemetry metrics collected or determined by telemetry engines, such as telemetry engine 1130. In some embodiments, telemetry engines may be separate from catalog engines as shown here. Also, in some embodiments, telemetry engines may be part of or otherwise embedded in catalog engines.

Also, in one or more embodiments, various types of collected user telemetry may include a user's selection or non-selection of one or more particular elements or content in a display panel, pointing device (mouse) hover time over particular content or elements in a display panel, user dwell time between actions in a display panel, dwell time for viewing a display panel by a user, and the like.

In one or more of the various embodiments, catalog engines may be arranged to monitor telemetry information associated with one or more users.

Accordingly, in some embodiments, catalog engines may be arranged to provide one or more facilities to collect direct feedback from one or more of the users that may interact with information displayed in the one or more user interfaces. For example, in some embodiments, user interfaces may include controls that enable authorized users to grade one or more recommendations, product profiles, product taxonomy, or the like.

In some embodiments, grades or scores may be binary (e.g., like/dislike), discrete (e.g., one-four stars, letter grades), continuous values, or the like.

Also, in one or more of the various embodiments, catalog engines may be arranged to provide user interfaces that monitor how users interact with products, product profiles, product attributes, product taxonomies, or the like. In some embodiments, telemetry information employed to monitor user preferences may be based on monitoring user interactions as well as direct feedback. Accordingly, in some embodiments, product taxonomies, product profiles, search results, product recommendation, feedback information, channel report items, or the like that may appear well-formed but are ignored or discarded by users may be inferred to be poorly received. For example, for some embodiments, if the top ranked search results or product recommendations provided in response to user actions, or the like, are ignored or lower ranked results are favored by users, it may be inferred that there may be a problem with the data or the display of the data.

Further, in some embodiments, catalog engines may be arranged to receive telemetry information from other services or applications. Accordingly, in one or more of the various embodiments, catalog engines are not required to directly monitor activity associated with the product taxonomies, product profiles, channels, search results, recommendations, or the like. For example, for some embodiments, channel associated user interfaces, such as user interface 1122 may be displayed to users via desktop computer applications, mobile applications, web-based applications, or the like. In some embodiments, such applications may collect the telemetry information and provide some or all it to catalog engines or telemetry engines rather than requiring the catalog engines or telemetry engines to include monitoring facilities on user-side applications.

Accordingly, in some embodiments, catalog engine 1116 or telemetry engine 1130 may be arranged to collect metrics or telemetry associated with user interactions with user interface 1104 or user interface 1122 using a one or more of input/output interface 238, cameras 240, touch interface 244, keypad 252, audio interface 256, GPS, 258, open air gesture interface 260, haptic interface 264, pointing device interface 266, or the like, of a client computer, such as client computer 200. Similarly, in some embodiments, validation engine 1014, runtime engine 1016, or notification engine 1018 may be arranged to collect metrics or telemetry associated with user interactions with user interface 1004, user interface 1022, or user interface 1030 using a one or more of input/output interface 338, GPS 340, keyboard 352, audio interface 356, pointing device interface 358, or the like, of a network computer, such as network computer 300.

In some embodiments, catalog engines may be arranged to track mouse movement, eye movement, keystrokes, or the like, to determine how users may interact with information (e.g. products, search results, product attributes, or the like) displayed in user interfaces. Accordingly, in some embodiments, catalog engines may be arranged to evaluate at least the quality of various product taxonomies, taxonomy models, product model, product profiles, search results, product recommendations, or the like based on how users interact with them. For example, if users consistently select or otherwise favor interacting with products or results ranked lower than others, it may indicate that one or more models performing the ranking, selection, attribute selection, attribute value selection, product taxonomy generation, or the like, may be experiencing diminished or diminishing effectiveness. Likewise, in some embodiments, users may reject or ignore product recommendations, product search results, or the like which may indicate that one or more associated models or systems may be experiencing diminished or diminishing effectiveness.

In some embodiments, catalog engines may be arranged to associate a performance score with user interfaces employed for generating execution trees or employing execution tree results based on the user interaction metrics or telemetry. Accordingly, in some embodiments, if the performance score associated with a user interface falls below a defined threshold value, catalog engines may be arranged to suspend those user interfaces from operation. Or, in some embodiments, catalog engines may be arranged to automatically modify the deficient user interfaces.

Also, in some embodiments, telemetry engines may be arranged to collect and determine telemetry information that includes user telemetry, user feedback, and telemetry metrics that may be used to dynamically transform user interfaces, display panels, and the like. The dynamic transformation may include arrangement, re-arrangement, elimination, addition, or adaptation of content and visual elements in user interfaces and display panels based on at least the collected telemetry information.

Additionally, in some embodiments, telemetry engines may collect metrics associated with the one or more user interactions with the adaptive product information platform including content within the user interfaces and display panels. In some embodiments, user profiles may be configured to include user interface preferences based on collected user telemetry metrics and user feedback. Accordingly, in some embodiments, catalog engines may dynamically change the visual appearance of the user interfaces to improve the efficiency and effectiveness of the development platform or its user interfaces for the user. Catalog engines may be arranged to dynamically select, position, size, shape, remove, hide, inactivate, disable, highlight, or style one or more visual user interface components such as display panels, controls, elements and content based on one or more of user telemetry metrics and user feedback. For example, if users are tracked focusing on or navigating to particular user interface views, components or user interface panels, catalog engines may be arranged to highlight or size the preferred user interface elements and/or display panels. For example, if users are determined to rarely interact with a display panel such as display panel 1124, catalog engines may be arranged to reduce the size, diminish the shape, disable its controls, and re-position display panel 1124 by displaying a smaller sized greyed out version of display panel 1124 below display panel 1126. Likewise, for example, catalog engines may be arranged to modify the ordering or display appearance of the content of individual display panels based on one or more telemetry metrics.

Also, in some embodiments, catalog engines may be arranged to adapt user interfaces based on the size/type of display, input methods, user status, or the like. For example, in some embodiments, if a user is determined to be operating using a mobile device, one or more user interface elements may be positioned differently. In some cases, for some embodiments, depending on the display type or display size, one or more user interface elements may be hidden from view.

Accordingly, in some embodiments, catalog engines may be arranged to tangibly modify user interfaces, display panels, interactive reports, input collection, input selection, input data representation, product taxonomy display, product profile display, search results, recommended products, or the like, based on the efficient and effective performance of processes and/or activities associated with various types product data, marketing information, search results, channel feedback reports, product recommendations, product display, or the like as determined by telemetry information, or the like.

Generalized Operations

FIGS. 12-16 represent generalized operations for adaptive product information platform in accordance with one or more of the various embodiments. In one or more of the various embodiments, processes 1200, 1300, 1400, 1500, and 1600 described in conjunction with FIGS. 12-16 may be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environments. However, embodiments are not so limited and various combinations of network computers, client computers, or the like may be utilized. Further, in one or more of the various embodiments, the processes described in conjunction with FIGS. 12-16 may be used for adaptive product information platforms in accordance with at least one of the various embodiments or architectures such as those described in conjunction with FIGS. 1-11. Further, in one or more of the various embodiments, some or all of the actions performed by processes 1200, 1300, 1400, 1500, and 1600 may be executed in part by catalog engine 322, telemetry engine 328, or the like, running on one or more processors of one or more network computers.

Figure 12:
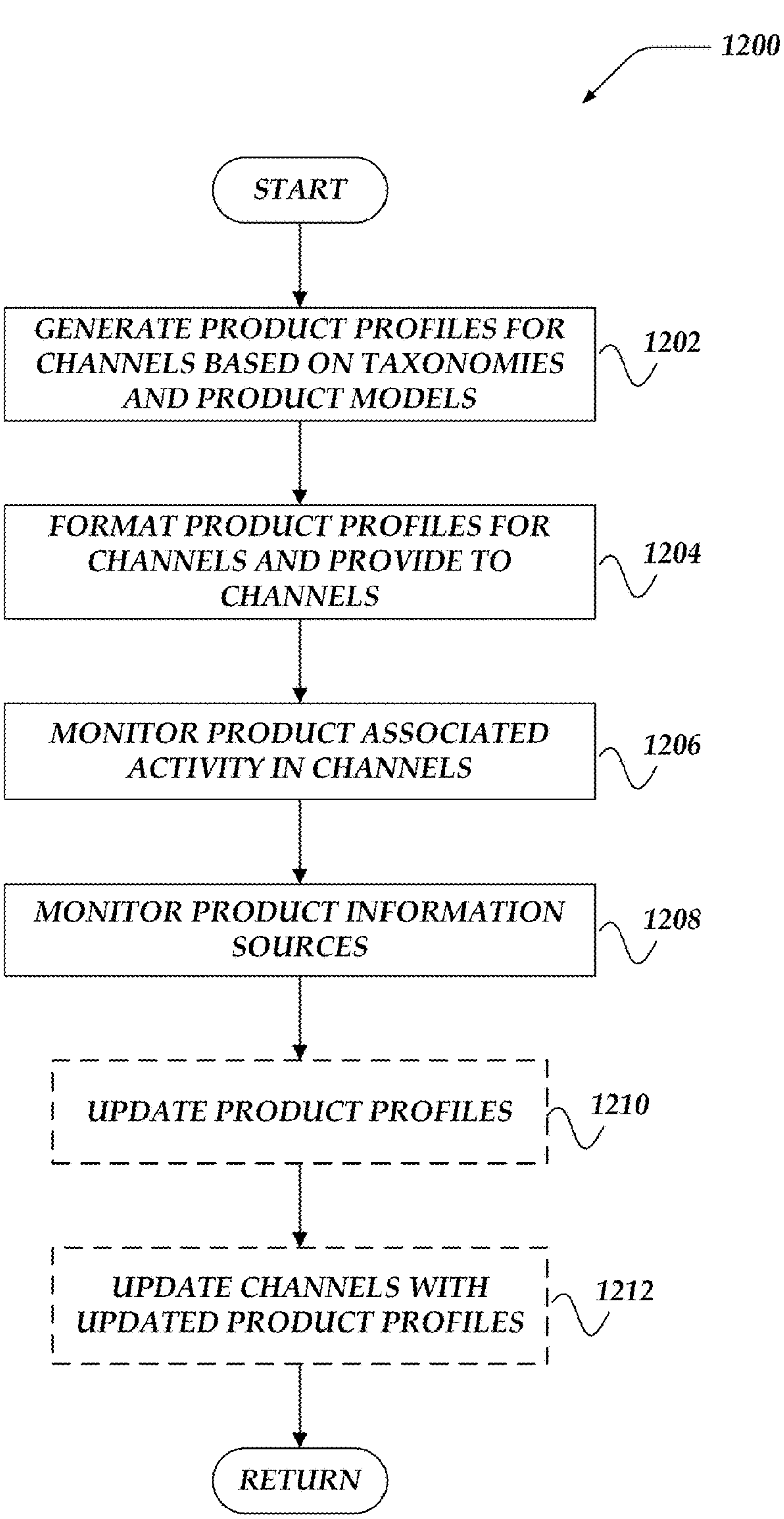
FIG. 12 illustrates an overview flowchart of a process for adaptive product information platforms in accordance with one or more of the various embodiments.

FIG. 12 illustrates an overview flowchart of process 1200 for adaptive product information platforms in accordance with one or more of the various embodiments. After a start block, at block 1202, in one or more of the various embodiments, catalog engines may be arranged to generate one or more product profiles for one or more channels based on one or more product taxonomies and one or more product models.

In some embodiments, catalog engines may be arranged to access current product taxonomies that define attributes or attribute values relevant to specific product types. In some embodiments, catalog engines may be arranged to employ product models that utilize machine learning classifiers, computer vision algorithms, natural language processing techniques, or the like to analyze product information or product images. Accordingly, in some embodiments, catalog engines may be arranged to generate comprehensive product profiles that include standardized attributes, descriptive content, search optimization terms, channel-specific formatting, or the like. In some embodiments, product profiles may be arranged to conform to the constraints or requirements of the relevant product taxonomies to ensure consistency across multiple distribution channels.

At block 1204, in one or more of the various embodiments, catalog engines may be arranged to format the one or more product profiles for the one or more channels such that the one or more product profiles may be provided to the one or more channels.

In some embodiments, catalog engines may be arranged to customize product profile formatting according to channel-specific requirements including data schemas, content length restrictions, attribute mappings, presentation guidelines, or the like. In some embodiments, catalog engines may be arranged to implement distribution mechanisms through automated synchronization processes, API integrations, batch file transfers, real-time streaming interfaces, or the like. Accordingly, in some embodiments, catalog engines may be arranged to ensure product profiles are compatible with each channel's technical infrastructure, business requirements, regulatory compliance needs, or the like.

At block 1206, in one or more of the various embodiments, catalog engines may be arranged to monitor product associated activity in the one or more channels.

In some embodiments, catalog engines may be arranged to collect channel feedback through automated data feeds, webhook notifications, performance metrics, customer interaction data, search analytics, telemetry engines, or the like. In some embodiments, catalog engines may be arranged to track product discovery rates, conversion statistics, search query patterns, customer engagement levels, user behavior indicators, or the like. Accordingly, in some embodiments, catalog engines may be arranged to identify opportunities for taxonomy improvements, content optimization, attribute refinements, or the like based on observed channel performance or customer interaction patterns.

At block 1208, in one or more of the various embodiments, catalog engines may be arranged to monitor one or more product information sources.

In some embodiments, catalog engines may be arranged to monitor external data sources including industry publications, social media platforms, trend forecasting services, celebrity style reports, fashion magazines, or the like. In some embodiments, catalog engines may be arranged to process marketing information through automated feeds, web scraping services, API integrations, partner data exchanges, or the like. Accordingly, in some embodiments, catalog engines may be arranged to identify emerging terminology, trending descriptors, new product features, seasonal qualifiers, cultural associations, or the like that may be relevant for updating product taxonomies or enhancing product profiles.

At block 1210, in one or more of the various embodiments, optionally, catalog engines may be arranged to update the one or more product profiles.

In some embodiments, catalog engines may be arranged to enhance existing product profiles with newly identified attributes, refined attribute values, improved search terms, updated categorization, or the like based on taxonomy updates or channel feedback analysis. In some embodiments, catalog engines may be arranged to prioritize product profile updates based on factors such as product popularity, channel importance, competitive positioning, customer demand indicators, or the like. Accordingly, in some embodiments, catalog engines may be arranged to validate updated product profiles through quality assurance processes, consistency checks, channel compatibility testing, or the like before distribution.

Note, this block is indicated as being optional because in some cases the product profiles may not require updating.

At block 1212, in one or more of the various embodiments, optionally, catalog engines may be arranged to update the one or more channels with the one or more updated product profiles.

In some embodiments, catalog engines may be arranged to coordinate distribution timing to minimize disruption to channel operations, customer experiences, search indexing processes, inventory management systems, or the like. In some embodiments, catalog engines may be arranged to implement staged rollout procedures, A/B testing scenarios, rollback capabilities, or the like to ensure successful deployment of updated product profiles. Thus, in some embodiments, catalog engines may be arranged to monitor distribution success through delivery confirmations, error tracking systems, performance impact assessment, channel operator feedback, or the like.

Note, this block is indicated as being optional because in some cases the channels may not require updated product profiles.

Figure 13:
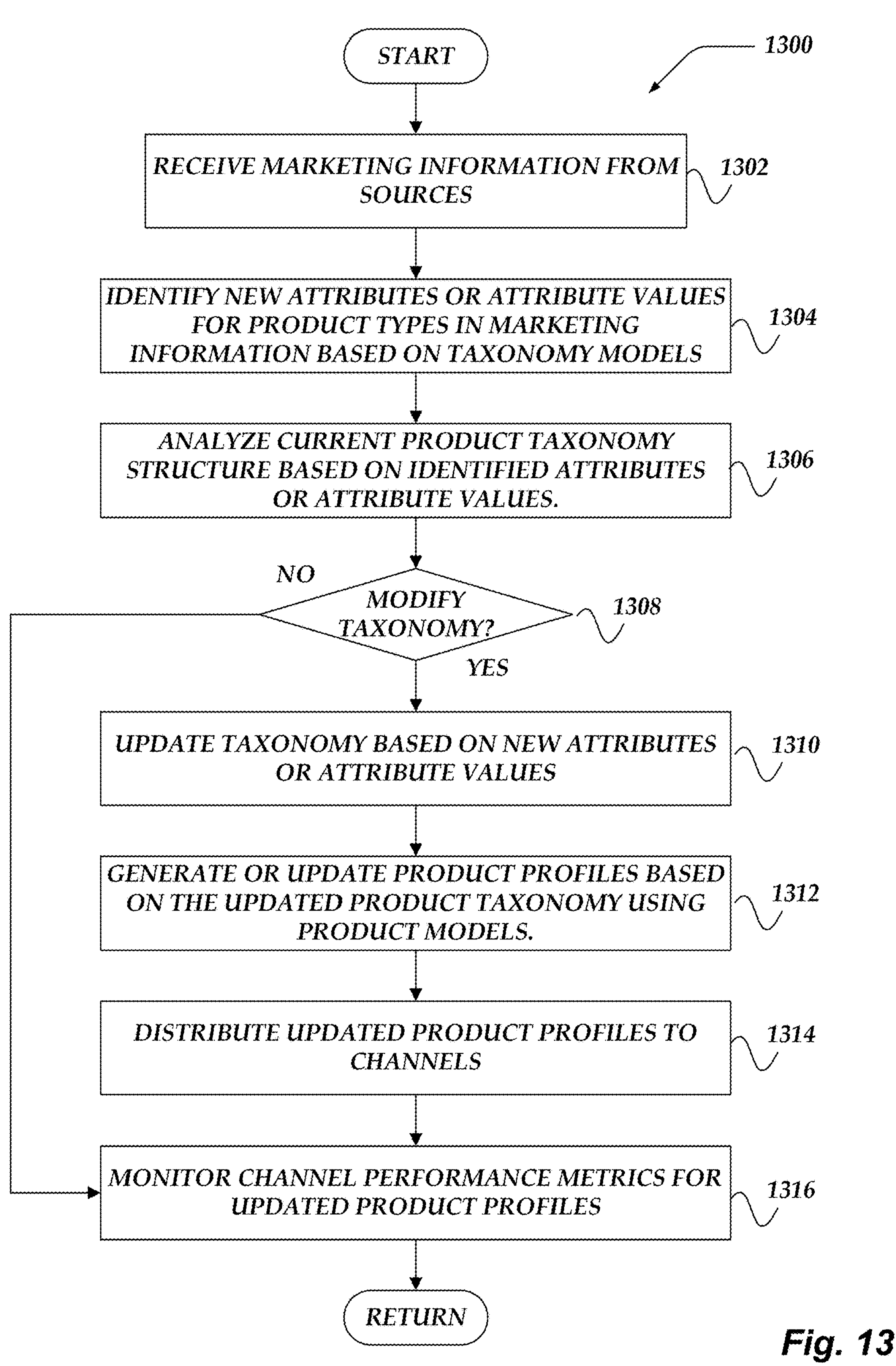
FIG. 13 illustrates a flowchart of a process for adaptive product information platforms in accordance with one or more of the various embodiments.

Next, in one or more of the various embodiments, control may be returned to a calling process FIG. 13 illustrates a flowchart of process 1300 for adaptive product information platforms in accordance with one or more of the various embodiments. After a start block, at block 1302, in one or more of the various embodiments, catalog engines may be arranged to receive marketing information from one or more sources.

In some embodiments, marketing information may include industry reports, fashion trend analyses, celebrity style publications, social media content, product announcements, customer review data, search query patterns, or the like. In some embodiments, catalog engines may be arranged to obtain marketing information through automated feeds, API integrations, web scraping services, partner data exchanges, manual uploads, or the like. Accordingly, in some embodiments, catalog engines may be arranged to process marketing information in various formats including structured data feeds, unstructured text documents, image collections, video content, social media posts, or the like. In some embodiments, catalog engines may be arranged to validate the authenticity or credibility of marketing information sources before processing the content for taxonomy updates. Also, in some embodiments, catalog engines may be arranged to use a list of sources of marketing information that may be vetted before using.

At block 1304, in one or more of the various embodiments, catalog engines may be arranged to identify one or more new attributes or attribute values for product types based on the marketing information and taxonomy models.

In some embodiments, taxonomy models may be arranged to employ natural language processing, machine learning classifiers, semantic analysis, pattern recognition algorithms, or the like to extract potential attributes or attribute values from the marketing information. In some embodiments, catalog engines may be arranged to identify emerging terminology, trending descriptors, new product features, style variations, color names, material types, sizing conventions, or the like that may be relevant to existing product types. Accordingly, in some embodiments, taxonomy models may be arranged to cross-reference identified terms against existing product taxonomies to determine if the terms represent genuinely new concepts or variations of existing attributes or attribute values. In some embodiments, catalog engines may be arranged to assign confidence scores to identified attributes or attribute values based on frequency of occurrence, source credibility, contextual relevance, industry validation, or the like.

At block 1306, in one or more of the various embodiments, catalog engines may be arranged to analyze current product taxonomies content or structure based on the one or more new attributes or attribute values.

In some embodiments, catalog engines may be arranged to evaluate how new attributes or attribute values may integrate with existing taxonomy hierarchies, dependency relationships, synonym mappings, value constraints, or the like. In some embodiments, catalog engines may be arranged to identify potential conflicts, redundancies, organizational improvements, structural optimizations, or the like that may result from incorporating the new attributes or attribute values. Accordingly, in some embodiments, catalog engines may be arranged to assess the impact on existing product profiles, channel compatibility, search optimization, user experience, or the like that would result from taxonomy modifications. In some embodiments, catalog engines may be arranged to determine if new attributes should be positioned as independent values, dependent sub-values, synonym variations, regional alternatives, or the like within the taxonomy structure.

At decision block 1308, in one or more of the various embodiments, if the product taxonomy may be modified, control may flow block 1310; otherwise, control may flow to block 1316.

In some embodiments, catalog engines may be arranged to evaluate modification criteria including attribute relevance thresholds, confidence score requirements, business rule compliance, quality standards, approval workflows, or the like. In some embodiments, catalog engines may be arranged to consider factors such as market significance, customer demand indicators, competitive analysis, industry adoption rates, seasonal relevance, or the like if determining modification appropriateness. Accordingly, in some embodiments, catalog engines may be arranged to apply configured policies that govern taxonomy change management, including approval requirements, testing protocols, rollback procedures, impact assessments, or the like.

In some embodiments, modifications to taxonomies may include determining that one or more attribute values should be removed a taxonomy or deemphasized in the taxonomy. For example, for some embodiments, one or more attribute values may be transient attribute values that are no longer relevant.

At block 1310, in one or more of the various embodiments, catalog engines may be arranged to update the product taxonomies based on the one or more new attributes or attribute values.

In some embodiments, catalog engines may be arranged to implement taxonomy updates through structured modification processes that maintain data integrity, referential consistency, version control, audit trails, or the like. In some embodiments, catalog engines may be arranged to insert new attributes at appropriate hierarchy levels, establish dependency relationships, configure value constraints, update synonym mappings, or the like. Accordingly, in some embodiments, catalog engines may be arranged to validate updated taxonomies through automated testing, consistency checks, schema validation, business rule verification, or the like. In some embodiments, catalog engines may be arranged to create taxonomy version snapshots, backup previous versions, document change histories, notify stakeholders, or the like during the update process.

Also, in some embodiments, as described above, one or more attribute values may be transient attribute values. Accordingly, in some embodiments, updating taxonomies may include removing one or more transient attribute values that may be determined to be irrelevant. Also, in general, one or more attribute values may be removed or deemphasized even if those attribute values were not explicitly considered or designated as transient attribute values.

At block 1312, in one or more of the various embodiments, catalog engines may be arranged to generate or update one or more product profiles based on the updated product taxonomy using one or more product models.

In some embodiments, catalog engines may be arranged to identify existing product profiles that would benefit from the new taxonomy attributes or attribute values through compatibility analysis, relevance scoring, feature matching, gap identification, or the like. In some embodiments, catalog engines may be arranged to apply product models to enhance existing product profiles with newly available attributes, refined attribute values, improved categorization, expanded search terms, or the like. Accordingly, in some embodiments, catalog engines may be arranged to prioritize product profile updates based on factors such as product popularity, channel importance, competitive advantage, customer demand, seasonal relevance, or the like. Thus, in some embodiments, catalog engines may be arranged to validate updated product profiles through quality checks, completeness verification, consistency validation, channel compatibility testing, or the like.

Likewise, in some embodiments, if one or more attribute values have been removed from a product taxonomy, catalog engines may be arranged to remove those attribute values from the associated product profiles.

At block 1314, in one or more of the various embodiments, catalog engines may be arranged to distribute the one or more updated product profiles to one or more channels.

In some embodiments, catalog engines may be arranged to format updated product profiles according to channel-specific requirements, API specifications, data schemas, content guidelines, or the like. In some embodiments, catalog engines may be arranged to implement distribution through automated synchronization processes, batch updates, real-time streaming, webhook notifications, API calls, or the like. Accordingly, in some embodiments, catalog engines may be arranged to coordinate distribution timing to minimize disruption to channel operations, customer experiences, search indexing, inventory management, or the like. In some embodiments, catalog engines may be arranged to monitor distribution success through delivery confirmations, error tracking, performance metrics, channel feedback, or the like.

At block 1316, in one or more of the various embodiments, catalog engines may be arranged to monitor one or more channel activity metrics for the updated product profiles.

In some embodiments, catalog engines may be arranged to collect metrics including search query performance, product discovery rates, customer engagement levels, conversion statistics, user feedback scores, or the like. In some embodiments, catalog engines may be arranged to track comparative performance between updated product profiles or previous versions through A/B testing, cohort analysis, trend monitoring, statistical evaluation, or the like. Accordingly, in some embodiments, catalog engines may be arranged to identify opportunities for further taxonomy refinements based on observed channel performance, customer behavior patterns, market response indicators, competitive benchmarking, or the like. Thus, in some embodiments, catalog engines may be arranged to generate performance reports, trend analyses, optimization recommendations, quality assessments, or the like for stakeholder review or automated decision-making processes.

Next, in one or more of the various embodiments, control may be returned to a calling process.

Figure 14:
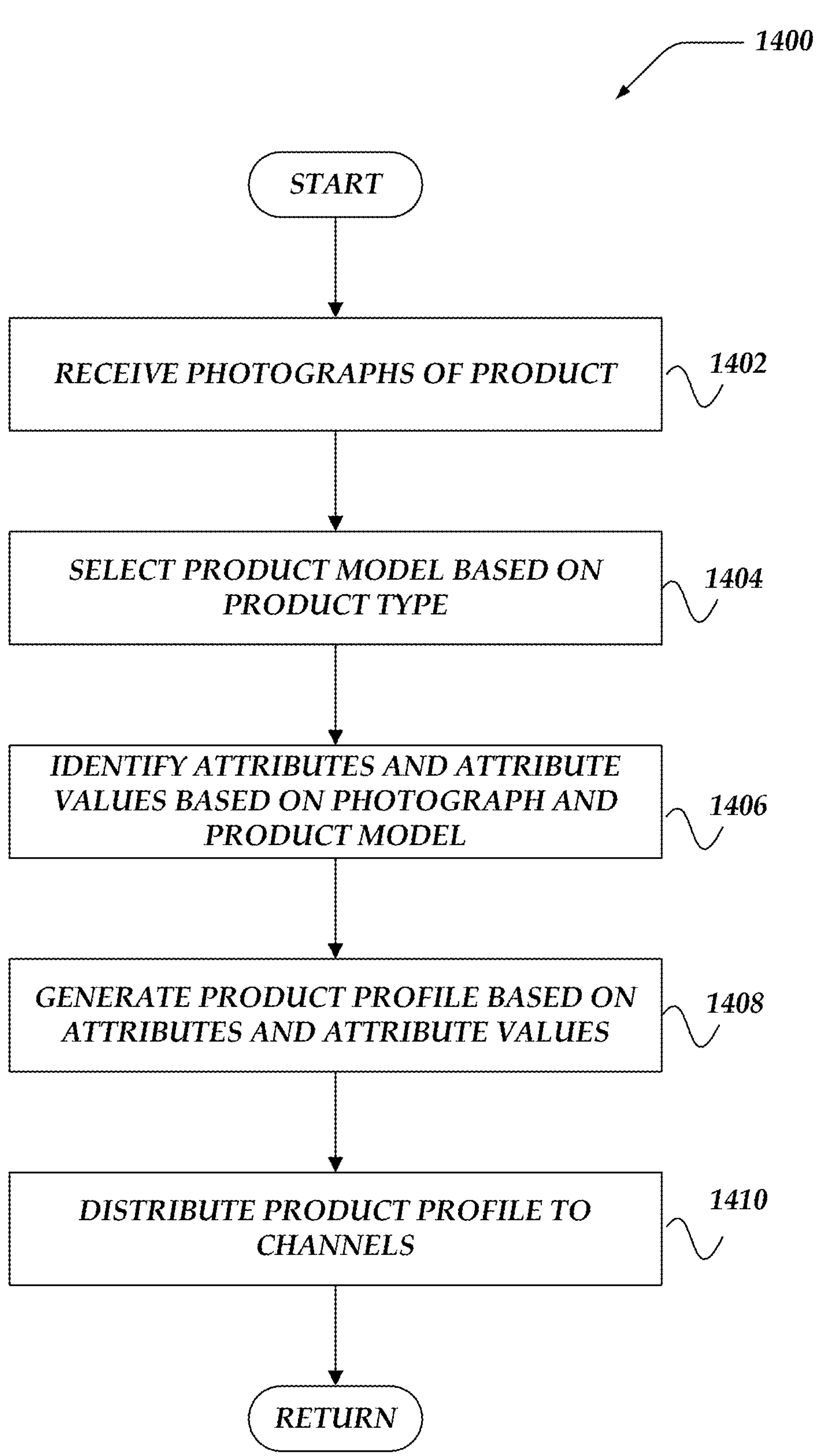
FIG. 14 illustrates a flowchart of a process for adaptive product information platforms in accordance with one or more of the various embodiments.

FIG. 14 illustrates a flowchart of process 1400 for adaptive product information platforms in accordance with one or more of the various embodiments. After a start block, at block 1402, in one or more of the various embodiments, catalog engines may be arranged to receive one or more photographs of product.

In some embodiments, catalog engines may be arranged to receive photographs through various input mechanisms including direct file uploads, automated image feeds from retailers, batch processing systems, streaming interfaces from product photography services, mobile application submissions, or the like. In some embodiments, photographs may be provided in multiple formats such as JPEG, PNG, TIFF, RAW camera formats, or other digital image standards that may be processed by the catalog engines. Accordingly, in some embodiments, catalog engines may be arranged to validate image quality parameters including resolution thresholds, color depth requirements, file size constraints, metadata completeness, lighting conditions, background clarity, or the like to ensure photographs are suitable for product analysis.

In some embodiments, catalog engines may be arranged to receive supplementary information alongside photographs including product identifiers, manufacturer specifications, retailer catalog references, pricing information, availability status, geographic sourcing details, or the like.

Accordingly, in some embodiments, catalog engines may be arranged to associate this supplementary information with the corresponding photographs to enable more comprehensive product profile generation that incorporates both visual analysis results or contextual product data.

At block 1404, in one or more of the various embodiments, catalog engines may be arranged to select a product models based on the product type.

In some embodiments, catalog engines may be arranged to determine the appropriate product type through automated classification techniques including machine learning classifiers, computer vision algorithms, metadata analysis, filename pattern recognition, contextual clues from accompanying information, or the like. In some embodiments, product models may be specialized for particular product categories such as clothing items, electronics, home goods, automotive parts, beauty products, sports equipment, or the like, with each model trained to recognize category-specific attributes or visual characteristics.

Accordingly, in some embodiments, catalog engines may be arranged to maintain a registry of available product models that maps product types to their corresponding specialized models, including version information, capability descriptions, supported attribute types, accuracy metrics, processing requirements, or the like. In some embodiments, catalog engines may be arranged to select the most appropriate product model based on confidence scores from initial product type classification, user-specified preferences, historical performance data for similar products, computational resource availability, or the like.

At block 1406, in one or more of the various embodiments, catalog engines may be arranged to identify one or more attributes or attribute values based on the one or more photographs and the product model.

In some embodiments, catalog engines may be arranged to employ the selected product model to analyze visual characteristics of the photographs through computer vision techniques including object detection algorithms, color analysis systems, texture recognition methods, shape classification procedures, pattern identification techniques, dimensional estimation processes, or the like. In some embodiments, product models may be arranged to extract specific attributes relevant to the identified product type such as color variations, material compositions, size indicators, style characteristics, brand identifiers, condition assessments, or the like.

Accordingly, in some embodiments, catalog engines may be arranged to map the identified visual characteristics to standardized attribute values that conform to the relevant product taxonomy, ensuring consistency with established vocabulary, synonym recognition, hierarchical value relationships, regional variations, industry standards, or the like. In some embodiments, catalog engines may be arranged to assign confidence scores to each identified attribute or attribute value based on image quality factors, model certainty levels, consistency across multiple product angles, historical accuracy rates, validation against known standards, or the like.

In some embodiments, catalog engines may be arranged to identify attributes that may not be directly visible in photographs through inference techniques that consider contextual relationships, product category standards, typical feature combinations, manufacturing conventions, market positioning indicators, or the like. Thus, in some embodiments, catalog engines may be arranged to enrich the attribute identification process by incorporating knowledge from product taxonomies that extend beyond purely visual characteristics.

At block 1408, in one or more of the various embodiments, catalog engines may be arranged to generate one or more product profiles based on the one or more attributes or attribute values.

In some embodiments, catalog engines may be arranged to assemble the identified attributes or attribute values into structured product profiles that conform to the data formats, schema requirements, field specifications, validation rules, completeness standards, quality thresholds, or the like established for the relevant product type. In some embodiments, product profiles may be arranged to include primary attributes that directly describe core product characteristics, secondary attributes that provide additional descriptive detail, search optimization attributes that improve discoverability, marketing attributes that support promotional activities, or the like.

Accordingly, in some embodiments, catalog engines may be arranged to validate the generated product profiles against product taxonomy constraints to ensure attribute completeness, value consistency, dependency satisfaction, mutual exclusivity compliance, hierarchical relationship accuracy, synonym mapping correctness, or the like. In some embodiments, catalog engines may be arranged to enhance product profiles with additional metadata including generation timestamps, confidence metrics, source photograph references, model version identifiers, processing parameters, quality indicators, or the like.

In some embodiments, catalog engines may be arranged to generate multiple product profile variations tailored for different distribution channels, each incorporating channel-specific attribute selections, formatting requirements, content guidelines, presentation preferences, search optimization strategies, regulatory compliance needs, or the like. Thus, in some embodiments, catalog engines may be arranged to enable consistent product representation across diverse sales channels while maintaining the flexibility to adapt product profiles for specific channel requirements or customer expectations.

Next, in one or more of the various embodiments, control may be returned to a calling process.

Figure 15:
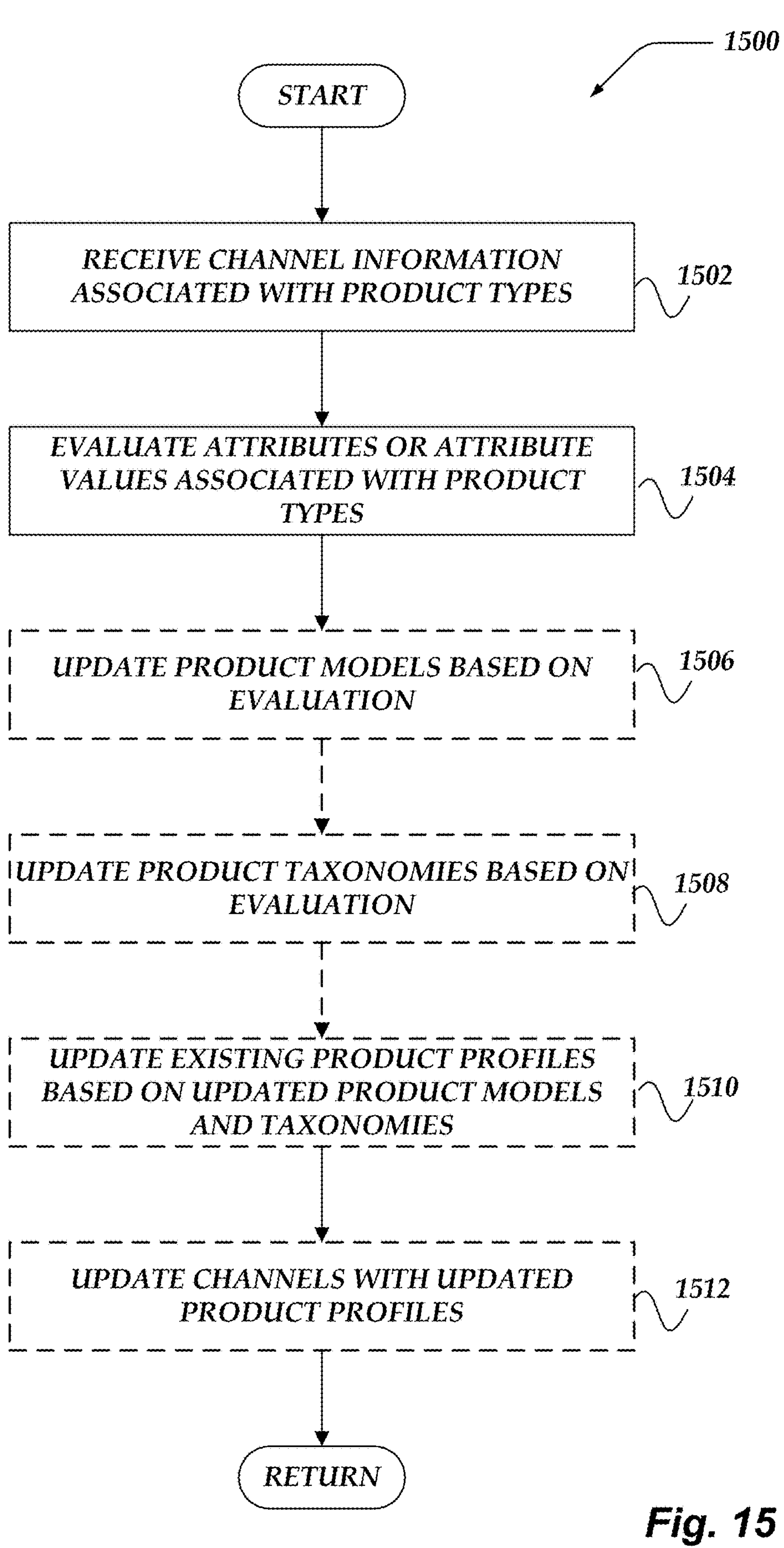
FIG. 15 illustrates a flowchart of a process for adaptive product information platforms in accordance with one or more of the various embodiments.

FIG. 15 illustrates a flowchart of process 1500 for adaptive product information platforms in accordance with one or more of the various embodiments. After a start block, at block 1502, in one or more of the various embodiments, catalog engines may be arranged to receive channel information associated with one or more product types.

In some embodiments, catalog engines may be arranged to collect channel information through automated data feeds, API integrations, webhook notifications, batch data transfers, real-time streaming interfaces, or the like. In some embodiments, channel information may include customer search behavior data such as successful search queries, unsuccessful search attempts, search refinement patterns, zero-result queries, abandoned search sessions, or the like. Accordingly, in some embodiments, catalog engines may be arranged to receive sales performance metrics including conversion rates, bounce rates, add-to-cart frequencies, purchase completion rates, average order values, cross-sell success rates, up-sell conversion metrics, or the like.

In some embodiments, catalog engines may be arranged to obtain customer interaction data such as product view durations, image zoom activities, specification section engagement, review reading patterns, comparison feature usage, wishlist additions, social sharing behaviors, or the like. Accordingly, in some embodiments, catalog engines may be arranged to collect channel-specific feedback including merchant reports, customer service inquiries, return reason codes, product rating distributions, review sentiment analysis, feature request patterns, or the like.

At block 1504, in one or more of the various embodiments, catalog engines may be arranged to evaluate one or more attributes or one or more attribute values that may be associated with the one or more product types.

In some embodiments, catalog engines may be arranged to analyze search query patterns to identify frequently used terms that may not be represented in current product taxonomies, including colloquial expressions, regional terminology variations, emerging trend descriptors, brand-specific language, seasonal qualifiers, or the like. In some embodiments, catalog engines may be arranged to evaluate attribute effectiveness by correlating specific attribute values with conversion success rates, customer engagement levels, search result relevance scores, user satisfaction indicators, or the like.

Accordingly, in some embodiments, catalog engines may be arranged to identify attribute gaps through analysis of unsuccessful search attempts, zero-result queries, customer support requests, product return feedback, competitive analysis data, or the like. In some embodiments, catalog engines may be arranged to assess attribute value distribution patterns to determine if current taxonomy structures adequately represent market demand, customer preferences, inventory distributions, seasonal variations, geographic preferences, or the like.

In some embodiments, catalog engines may be arranged to evaluate cross-sell or up-sell relationship data to identify missing attribute connections, complementary product indicators, bundle opportunity markers, compatibility specifications, usage context descriptors, or the like.

At block 1506, in one or more of the various embodiments, optionally, catalog engines catalog engines may be arranged to update one or more product models based on the evaluation of the channel information.

In some embodiments, catalog engines may be arranged to enhance product models with improved recognition capabilities for attributes that demonstrate high correlation with successful customer interactions, sales conversions, positive reviews, repeat purchases, referral activities, or the like. In some embodiments, catalog engines may be arranged to adjust model weighting algorithms to prioritize attributes that may consistently lead to better search results, higher customer satisfaction scores, increased engagement metrics, improved discovery rates, or the like.

Accordingly, in some embodiments, catalog engines may be arranged to incorporate new training data derived from successful channel interactions to improve model accuracy for attribute identification, value classification, synonym recognition, context understanding, quality assessment, or the like. In some embodiments, catalog engines may be arranged to refine model parameters based on channel-specific performance indicators to optimize results for particular sales environments, customer demographics, seasonal patterns, geographic markets, device usage patterns, or the like.

Note, this block is indicated as being optional because in some cases for some embodiments the evaluation of the channel information may not trigger updates to the one or more product models.

At block 1508, in one or more of the various embodiments, optionally, catalog engines may be arranged to update one or more product taxonomies based on the evaluation of the channel information.

In some embodiments, catalog engines may be arranged to incorporate high-performing search terms as new attribute values, synonym mappings, alternative descriptors, regional variations, trend-based qualifiers, or the like within relevant product taxonomies. In some embodiments, catalog engines may be arranged to restructure taxonomy hierarchies based on observed customer navigation patterns, search refinement behaviors, category affinity data, cross-category relationships, or the like.

Accordingly, in some embodiments, catalog engines may be arranged to add new attributes that address frequently requested product characteristics identified through customer inquiries, search patterns, review feedback, competitive analysis, market research data, or the like. In some embodiments, catalog engines may be arranged to retire or demote attribute values that demonstrate consistently poor performance indicators such as low search usage, minimal customer engagement, high bounce rates, negative correlation with conversions, or the like.

Thus, in some embodiments, catalog engines may be arranged to establish new attribute relationships based on successful cross-sell patterns, complementary product associations, bundle performance data, customer behavior correlations, or the like.

Note, this block is indicated as being optional because in some cases for some embodiments the evaluation of the channel information may not trigger updates to the one or more product taxonomies.

At block 1510, in one or more of the various embodiments, optionally, catalog engines may be arranged to update one or more existing product profiles based on the one or more updated product models or updated product taxonomies.

In some embodiments, catalog engines may be arranged to regenerate product profiles using updated product models to incorporate newly identified attributes, refined attribute values, improved categorization accuracy, enhanced search optimization terms, or the like. In some embodiments, catalog engines may be arranged to enrich existing product profiles with attribute values that have demonstrated strong performance correlations in channel feedback data, including high-converting descriptors, popular search terms, effective cross-sell indicators, or the like.

Accordingly, in some embodiments, catalog engines may be arranged to prioritize product profile updates based on factors such as product performance metrics, inventory levels, seasonal relevance, channel importance rankings, customer demand indicators, competitive positioning requirements, or the like. In some embodiments, catalog engines may be arranged to validate updated product profiles through quality assurance processes including consistency checks, completeness verification, channel compatibility testing, search optimization validation, or the like.

Note, this block is indicated as being optional because in some cases for some embodiments the evaluation of the channel information may not trigger updates to the one or more product profiles.

At block 1512, in one or more of the various embodiments, optionally, catalog engines may be arranged to update one or more channels with the one or more updated product profiles.

In some embodiments, catalog engines may be arranged to distribute updated product profiles through channel-specific delivery mechanisms including API synchronization, batch file transfers, real-time streaming updates, webhook notifications, manual upload processes, or the like. In some embodiments, catalog engines may be arranged to coordinate update timing to minimize disruption to channel operations, customer experiences, search index rebuilding, inventory synchronization, promotional campaigns, or the like.

Accordingly, in some embodiments, catalog engines may be arranged to customize product profile formatting for each channel's specific requirements including data schemas, field mappings, content length restrictions, image specifications, metadata requirements, or the like. Thus, in some embodiments, catalog engines may be arranged to monitor update deployment success through delivery confirmation tracking, error reporting systems, channel performance metrics, customer impact assessment, rollback capability maintenance, or the like.

Note, this block is indicated as being optional because in some cases for some embodiments the evaluation of the channel information may not trigger updates to the one or more channels.

Figure 16:
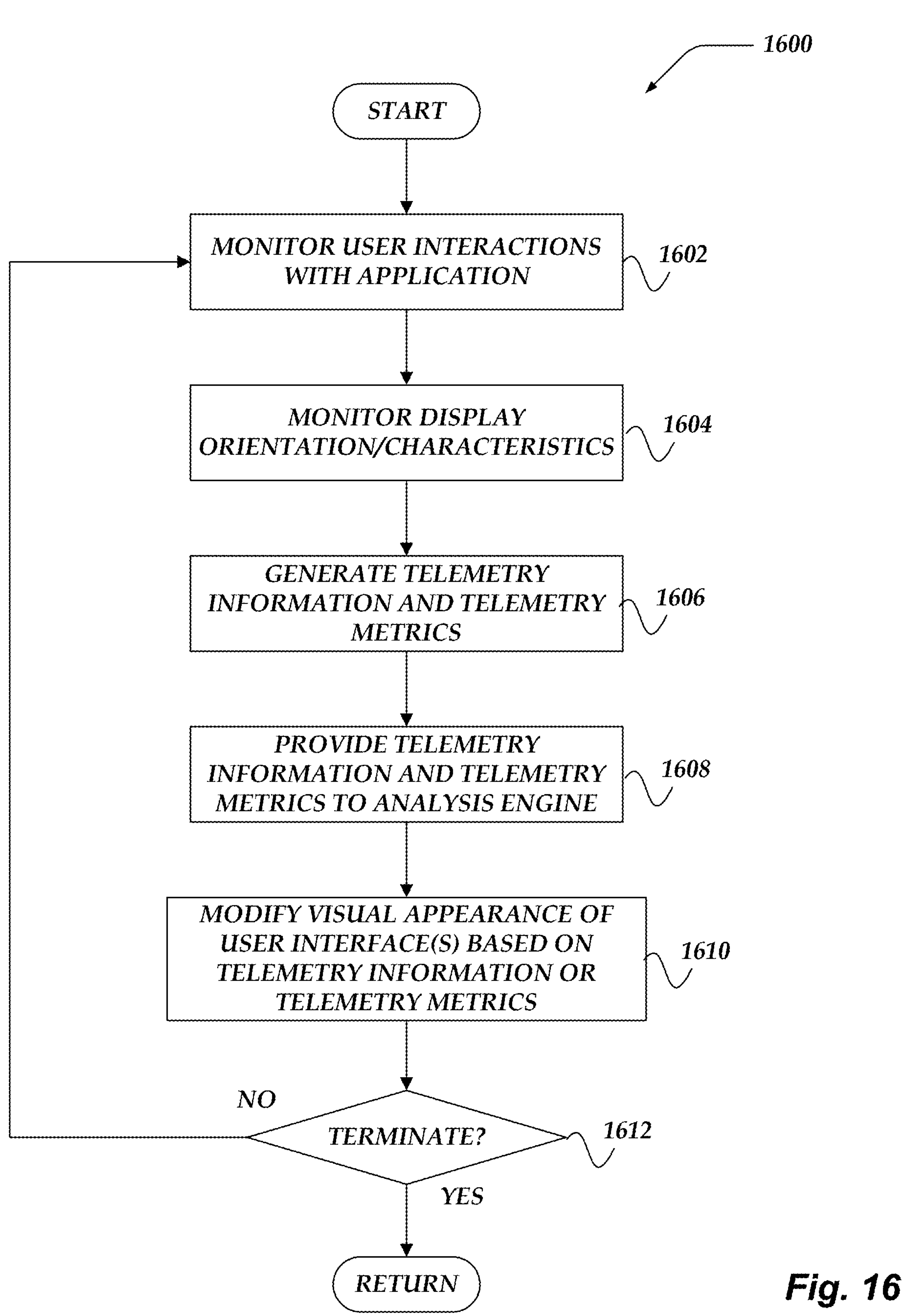
FIG. 16 illustrates a flowchart of a process for collecting and applying telemetry information and telemetry metrics for adaptive product information platforms in accordance with one or more of the various embodiments.

Next, in one or more of the various embodiments, control may be returned to a calling process FIG. 16 illustrates a flowchart of process 1600 for collecting and applying telemetry information and telemetry metrics for adaptive product information platforms in accordance with one or more of the various embodiments. After a start block, at block 1602, in one or more of the various embodiments, telemetry engines may be arranged to monitor one or more user interactions with one or more applications. As described above, telemetry engines may be arranged to monitor or track how users may physically interact with one or more user interfaces associated with the one or more applications. In some embodiments, user interactions may include active interactions associated with user activity or passive interactions associated with user inactivity. Also, in one or more embodiments, various types of collected user telemetry may be based on a user's selection or non-selection of one or more particular elements or content in a display panel, pointing device (mouse) hover time over particular content or elements in a display panel, user dwell time between actions in a display panel, dwell time for viewing a display panel by a user, and the like. Also, in some embodiments, telemetry engines may be arranged to track mouse movement, eye movement, keystrokes, or the like, to determine how users may interact with information displayed in user interfaces. See, description for FIG. 4 for additional details.

At block 1604, in one or more of the various embodiments, telemetry engines may be arranged to monitor one or more display characteristics or display orientation characteristics.

As described above, in some embodiments, telemetry engines may be arranged to monitor various display characteristics employed for displaying the user interfaces, including the size/type of display, screen resolution, screen orientation, number of active displays, screen brightness, refresh rate, aspect ratio, color dynamic range, windowed or full screen modes, or the like. In some embodiments, screens, monitors, or operating systems may provide interfaces or APIs that enable telemetry engines to obtain information about the current state or status of the display screen. In some cases, for some embodiments, operating systems or other services may be configured to actively notify telemetry engines if one or more screen characteristics may change.

At block 1606, in one or more of the various embodiments, telemetry engines may be arranged to generate telemetry information or one or more telemetry metrics. In some embodiments, the monitored interactions or display characteristics may be represented as telemetry information or telemetry metrics. The particular format of the telemetry information or telemetry metrics may vary depending on the type interactions or characteristics being represented. Accordingly, in some embodiments, telemetry information or telemetry metrics may be included in one or more data structures that may be communicated to other applications or services. For example, in some embodiments, telemetry information or telemetry metrics may be represented using key-value pair data structures that include a key field representing the label or type of metric and a value field that represents the value of the metric.

At block 1608, in one or more of the various embodiments, telemetry engines may be arranged to provide the telemetry information and telemetry metrics to a runtime engine.

In some embodiments, telemetry engines may be arranged to provide one or more interfaces or APIs that enable other applications or services, such as catalog engines, or the like, to gain access to the telemetry information or telemetry metrics. In some embodiments, telemetry engines may be configured to push some or all of the telemetry information or telemetry metrics to one or more subscribing application or services. Also, in some embodiments, telemetry engines may be configured to enable other application or services to poll or otherwise request-on-demand some or all of the telemetry information or telemetry metrics.

At block 1610, in one or more of the various embodiments, catalog engines may be arranged to modify the visual appearance of one or more user interfaces based on the telemetry information or telemetry metrics.

Accordingly, in some embodiments, catalog engines may be arranged to dynamically change the visual appearance of the one or more user interfaces to improve the efficiency and effectiveness of the user interfaces based on some or all of the telemetry information or telemetry metrics. For example, catalog engines may be arranged to dynamically select, position, size, shape, remove, hide, inactivate, disable, highlight, or style one or more visual user interface components such as display panels, controls, elements, or content based on, among other things, one or more telemetry metrics. For example, if telemetry information or telemetry metrics indicate that users are focusing on or navigating to particular user interface views, components or user interface panels, catalog engines may be arranged to highlight or size the preferred user interface elements or display panels. For example, if users are determined to rarely interact with a particular display panel, catalog engines may be arranged to reduce the size, diminish the shape, disable its controls, and re-position that display panel to improve the efficiency of display screen usage. See, also FIG. 4 and its description.

At decision block 1612, in one or more of the various embodiments, if the telemetry engine, or catalog engine may be terminated, control may be returned to a calling process; otherwise, control may loop back to block 1602. In some embodiments, telemetry engines may be arranged to continuously or periodically provide updated/current telemetry information or telemetry metrics to enable catalog engines to dynamically change the visual appearance of the one or more user interfaces. Accordingly, in some embodiments, process 1600 may continue operation until it may be explicitly terminated or the operation of the associated catalog engines may be terminated.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of these innovations.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of these innovations.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing product information over a network using one or more processors to execute instructions and execute the following steps, comprising:

collecting one or more candidate values for one or more products based on received product information for the one or more products;

validating the one or more candidate values based on one or more attributes in a product taxonomy, wherein the one or more validated candidate values are normalized to conform to the product taxonomy;

obtaining one or more product profiles for the one or more products based on one or more attribute values, wherein the one or more product profiles are distributed to one or more channels that enable access to the one or more products for a consumer;

continuously collecting feedback information associated with the one or more products from the one or more channels, wherein the product taxonomy is iteratively updated based on the feedback information, and wherein the product taxonomy update includes one or more new attribute values associated with the feedback information that are evaluated based on one or more of a relevance score, a feature match, a compatibility analysis, a gap identification, newly available attribute value, a refined attribute value, a new categorization, or an expanded search term;

obtaining a prioritization for each updated product taxonomy based on one or more of a product popularity, an importance of each channel, a seasonal relevance, a consumer demand, a competitive advantage, an emerging product characteristic, a trending product terminology, or a new visual product characteristic;

continuously updating the one or more product profiles based on the updated and prioritized product taxonomy, wherein the one or more updated product profiles are redistributed to the one or more channels;

continuously updating the one or more channels based on the one or more updated product profiles, wherein a timing of distribution for each update to each channel is arranged to reduce disruption to one or more of channel operations, consumer experiences, search index rebuilding, product inventory synchronization or product promotional campaigns; and employing a catalog engine to obtain a user interface that includes one or more display panels of content having a visual appearance and ordering that is dynamically transformed and re-arranged to improve efficiency and effectiveness for a unique visual display presented to each consumer for accessing and non-accessing one or more portions of the one or more products associated with the one or more channels based on the each consumer's unique user telemetry for one or more physical interactions on non-interactions with the user interface, each consumer's unique user feedback and telemetry metrics, wherein the content includes information associated with the one or more accessed products, wherein the efficiency of the unique visual display is improved based on emphasizing one or more portions of content accessed by the consumer, diminishing the one or more portions of the content that are non-accessed by the consumer, and a type of one or more of an input device or a computing device that the consumer employs to view and interact with the display panels.

2. The method of claim 1, wherein the product information further comprises one or more of vendor-provided product descriptions, product specifications, marketing materials, social media content, or third-party product data feeds.

3. The method of claim 1, wherein validating the one or more candidate values further comprises:

executing one or more natural language processing actions to identify semantic similarity between the one or more candidate values and one or more existing attribute values in a current product taxonomy.

4. The method of claim 1, wherein normalizing the one or more candidate values further comprises:

converting one or more synonymous terms to standardized terminology defined in a current product taxonomy;

correcting one or more spelling variations based on the product taxonomy; and standardizing one or more units of measurement to match the one or more attribute values defined in the current product taxonomy.

5. The method of claim 1, further comprising:

obtaining marketing information from one or more external sources including one or more of an industry report, a trend analysis, or a fashion publication; and updating a current product taxonomy by including one or more new attribute values extracted from the marketing information that represents one or more emerging product characteristics or trending terminology.

6. The method of claim 1, further comprising:

receiving one or more images of the one or more products;

analyzing the one or more images to identify one or more visual characteristics of the one or more products; and mapping the one or more visual characteristics to one or more other attribute values in a current product taxonomy.

7. The method of claim 1, wherein the one or more channels include one or more of social media, an electronic commerce platform, an online marketplace, an email marketing platform, a messaging marketing platform, an advertising platform, a digital catalog, or a retail partner platform.

8. The method of claim 1, wherein the feedback information further comprises:

search query patterns from one or more consumers accessing the one or more channels; conversion statistics associated with the one or more products; and consumer interaction data including product view durations and engagement metrics.

9. The method of claim 1, further comprising:

formatting the one or more product profiles according to channel-specific requirements that include one or more of a data schema, a content length restriction, or an attribute mapping for each of the one or more channels.

10. The method of claim 1, further comprising:

organizing the one or more attributes in the product taxonomy in a hierarchical structure where broader attribute values serve as parent values for more specific dependent attribute values; and activating one or more dependent attributes based on one or more values of hierarchically superior attributes.

11. A network computer for managing product information over a network, comprising:

a memory that stores at least instructions; and one or more processors that execute the instructions and execute the following steps, including:

collecting one or more candidate values for one or more products based on received product information for the one or more products;

validating the one or more candidate values based on one or more attributes in a product taxonomy, wherein the one or more validated candidate values are normalized to conform to the product taxonomy;

obtaining one or more product profiles for the one or more products based on one or more attribute values, wherein the one or more product profiles are distributed to one or more channels that enable access to the one or more products for a consumer;

continuously collecting feedback information associated with the one or more products from the one or more channels, wherein the product taxonomy is iteratively updated based on the feedback information, and wherein the product taxonomy update includes one or more new attribute values associated with the feedback information that are evaluated based on one or more of a relevance score, a feature match, a compatibility analysis, a gap identification, newly available attribute value, a refined attribute value, a new categorization, or an expanded search term;

obtaining a prioritization for each updated product taxonomy based on one or more of a product popularity, an importance of each channel, a seasonal relevance, a consumer demand, a competitive advantage, an emerging product characteristic, a trending product terminology, or a new visual product characteristic;

continuously updating the one or more product profiles based on the updated and prioritized product taxonomy, wherein the one or more updated product profiles are redistributed to the one or more channels; and continuously updating the one or more channels based on the one or more updated product profiles, wherein a timing of distribution for each update to each channel is arranged to reduce disruption to one or more of channel operations, consumer experiences, search index rebuilding, product inventory synchronization or product promotional campaigns; and employing a catalog engine to obtain a user interface that includes one or more display panels of content having a visual appearance and ordering that is dynamically transformed and re-arranged to improve efficiency and effectiveness for a unique visual display presented to each consumer for accessing and non-accessing one or more portions of the one or more products associated with the one or more channels based on the each consumer's unique user telemetry for one or more physical interactions on non-interactions with the user interface, each consumer's unique user feedback and telemetry metrics, wherein the content includes information associated with the one or more accessed products, wherein the efficiency of the unique visual display is improved based on emphasizing one or more portions of content accessed by the consumer, diminishing the one or more portions of the content that are non-accessed by the consumer, and a type of one or more of an input device or a computing device that the consumer employs to view and interact with the display panels.

12. The network computer of claim 11, wherein the product information further comprises one or more of vendor-provided product descriptions, product specifications, marketing materials, social media content, or third-party product data feeds.

13. The network computer of claim 11, wherein validating the one or more candidate values further comprises:

executing one or more natural language processing actions to identify semantic similarity between the one or more candidate values and one or more existing attribute values in a current product taxonomy.

14. The network computer of claim 11, wherein normalizing the one or more candidate values further comprises:

converting one or more synonymous terms to standardized terminology defined in a current product taxonomy;

correcting one or more spelling variations based on the product taxonomy; and standardizing one or more units of measurement to match the one or more attribute values defined in the current product taxonomy.

15. The network computer of claim 11, wherein the one or more processors execute instructions that are configured to cause actions that perform actions, further comprising:

obtaining marketing information from one or more external sources including one or more of an industry report, a trend analysis, or a fashion publication; and updating a current product taxonomy by including one or more new attribute values extracted from the marketing information that represents one or more emerging product characteristics or trending terminology.

16. The network computer of claim 11, wherein the one or more processors execute instructions that are configured to cause actions that perform actions, further comprising: receiving one or more images of the one or more products;

analyzing the one or more images to identify one or more visual characteristics of the one or more products; and mapping the one or more visual characteristics to one or more other attribute values in a current product taxonomy.

17. The network computer of claim 11, wherein the one or more channels include one or more of social media, an electronic commerce platform, an online marketplace, an email marketing platform, a messaging marketing platform, an advertising platform, a digital catalog, or a retail partner platform.

18. The network computer of claim 11, wherein the feedback information further comprises:

search query patterns from one or more consumers accessing the one or more channels; conversion statistics associated with the one or more products; and consumer interaction data including product view durations and engagement metrics.

19. The network computer of claim 11, wherein the one or more processors execute instructions that are configured to cause actions that perform actions, further comprising:

formatting the one or more product profiles according to channel-specific requirements that include one or more of a data schema, a content length restriction, or an attribute mapping for each of the one or more channels.

20. A processor readable non-transitory storage media that includes instructions for managing product information over a network, wherein execution of the instructions by one or more processors performs execution of the following steps, comprising:

collecting one or more candidate values for one or more products based on received product information for the one or more products;

validating the one or more candidate values based on one or more attributes in a product taxonomy, wherein the one or more validated candidate values are normalized to conform to the product taxonomy;

obtaining one or more product profiles for the one or more products based on one or more attribute values, wherein the one or more product profiles are distributed to one or more channels that enable access to the one or more products for a consumer;

continuously collecting feedback information associated with the one or more products from the one or more channels, wherein the product taxonomy is iteratively updated based on the feedback information, and wherein the product taxonomy update includes one or more new attribute values associated with the feedback information that are evaluated based on one or more of a relevance score, a feature match, a compatibility analysis, a gap identification, newly available attribute value, a refined attribute value, a new categorization, or an expanded search term;

obtaining a prioritization for each updated product taxonomy based on one or more of a product popularity, an importance of each channel, a seasonal relevance, a consumer demand, a competitive advantage, an emerging product characteristic, a trending product terminology, or a new visual product characteristic;

continuously updating the one or more product profiles based on the updated and prioritized product taxonomy, wherein the one or more updated product profiles are redistributed to the one or more channels;

continuously updating the one or more channels based on the one or more updated product profiles, wherein a timing of distribution for each update to each channel is arranged to reduce disruption to one or more of channel operations, consumer experiences, search index rebuilding, product inventory synchronization or product promotional campaigns; and employing a catalog engine to obtain a user interface that includes one or more display panels of content having a visual appearance and ordering that is dynamically transformed and re-arranged to improve efficiency and effectiveness for a unique visual display presented to each consumer for accessing and non-accessing one or more portions of the one or more products associated with the one or more channels based on the each consumer's unique user telemetry for one or more physical interactions on non-interactions with the user interface, each consumer's unique user feedback and telemetry metrics, wherein the content includes information associated with the one or more accessed products, wherein the efficiency of the unique visual display is improved based on emphasizing one or more portions of content accessed by the consumer, diminishing the one or more portions of the content that are non-accessed by the consumer, and a type of one or more of an input device or a computing device that the consumer employs to view and interact with the display panels.

* * * * *